(12) United States Patent
Hoch et al.

(10) Patent No.: US 8,660,924 B2
(45) Date of Patent: *Feb. 25, 2014

(54) CONFIGURABLE INTERACTIVE ASSISTANT

(75) Inventors: Michael Hoch, San Francisco, CA (US); Peter W. Stevenson, Burlingame, CA (US); Kevin C. Dunn, Roseville, CA (US); Michael Mills, Redwood City, CA (US); Roger Bradley-Jungemann, Half Moon Bay, CA (US)

(73) Assignee: Navera, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,926

(22) Filed: Oct. 4, 2011

(65) Prior Publication Data

US 2012/0330791 A1 Dec. 27, 2012

Related U.S. Application Data

(63) Continuation-in-part of application No. 12/433,720, filed on Apr. 30, 2009, now Pat. No. 8,060,386.

(60) Provisional application No. 61/289,405, filed on Oct. 4, 2010.

(51) Int. Cl.
*G06Q 40/00* (2012.01)

(52) U.S. Cl.
USPC .................. 705/35; 705/39; 705/40; 705/4

(58) Field of Classification Search
USPC ............................. 705/4, 35, 39, 40
See application file for complete search history.

(56) References Cited

U.S. PATENT DOCUMENTS

| | | | |
|---|---|---|---|
| 2003/0028498 A1* | 2/2003 | Hayes-Roth | 706/17 |
| 2007/0202484 A1* | 8/2007 | Toombs et al. | 434/350 |
| 2010/0030578 A1* | 2/2010 | Siddique et al. | 705/3 |
| 2010/0107214 A1* | 4/2010 | Ganz | 726/1 |
| 2010/0275215 A1* | 10/2010 | Suomela et al. | 718/106 |
| 2011/0004481 A1* | 1/2011 | Jones | 705/1.1 |

* cited by examiner

*Primary Examiner* — Lalita M Hamilton
(74) *Attorney, Agent, or Firm* — Michael K. Bosworth; IPxLaw Group LLP

(57) ABSTRACT

The present invention employs branded virtual characters across multiple network platforms throughout various stages of complex transactions (eg, selling insurance). These characters initially engage prospective customers on a network platform, such as a social network, and persist over time across other network platforms (eg, university and company websites) to educate consumers until they are ready to purchase—e.g., from their "trusted advisor"—particular products and services offered by various providers. An extensible configuration tool ("Config Tool") is provided to simplify the continued development of such a system, as well as customization of individual Product Modules (e.g., a Life Insurance Module) by product and service providers (e.g., insurance companies and employers) and other third-party developers (before and during runtime). This Config Tool provides a variety of extension points permitting virtual characters to be added and their appearance and behavior modified, along with the details of the products and services being offered.

14 Claims, 28 Drawing Sheets

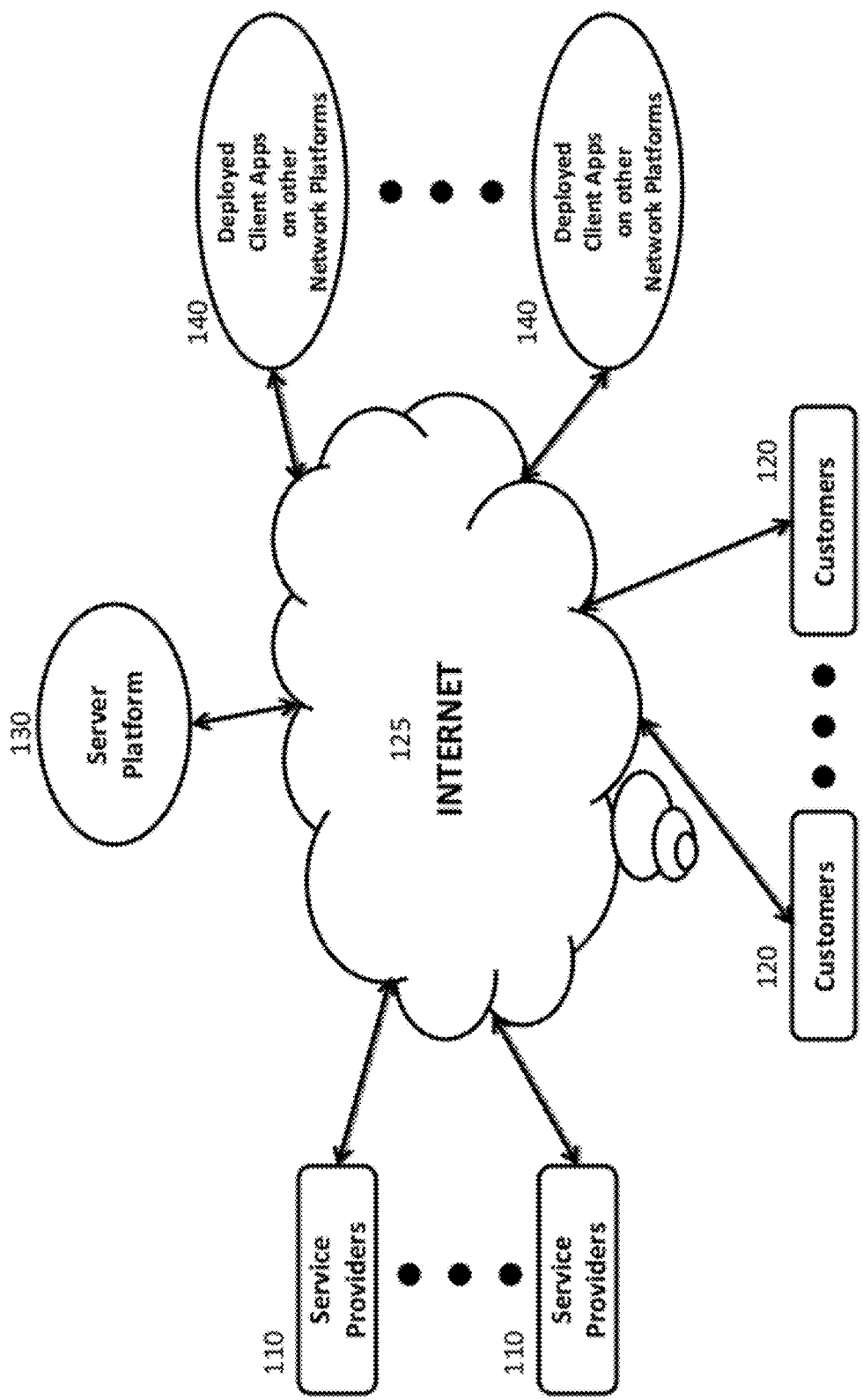

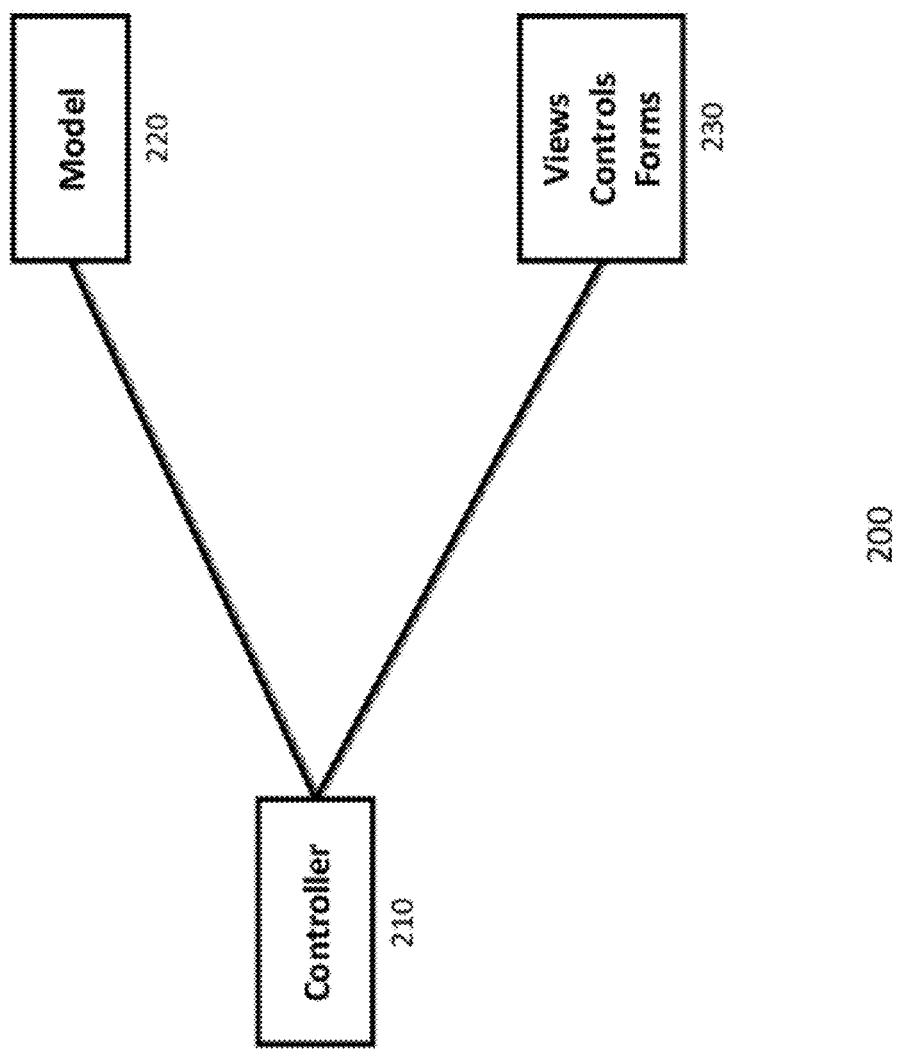

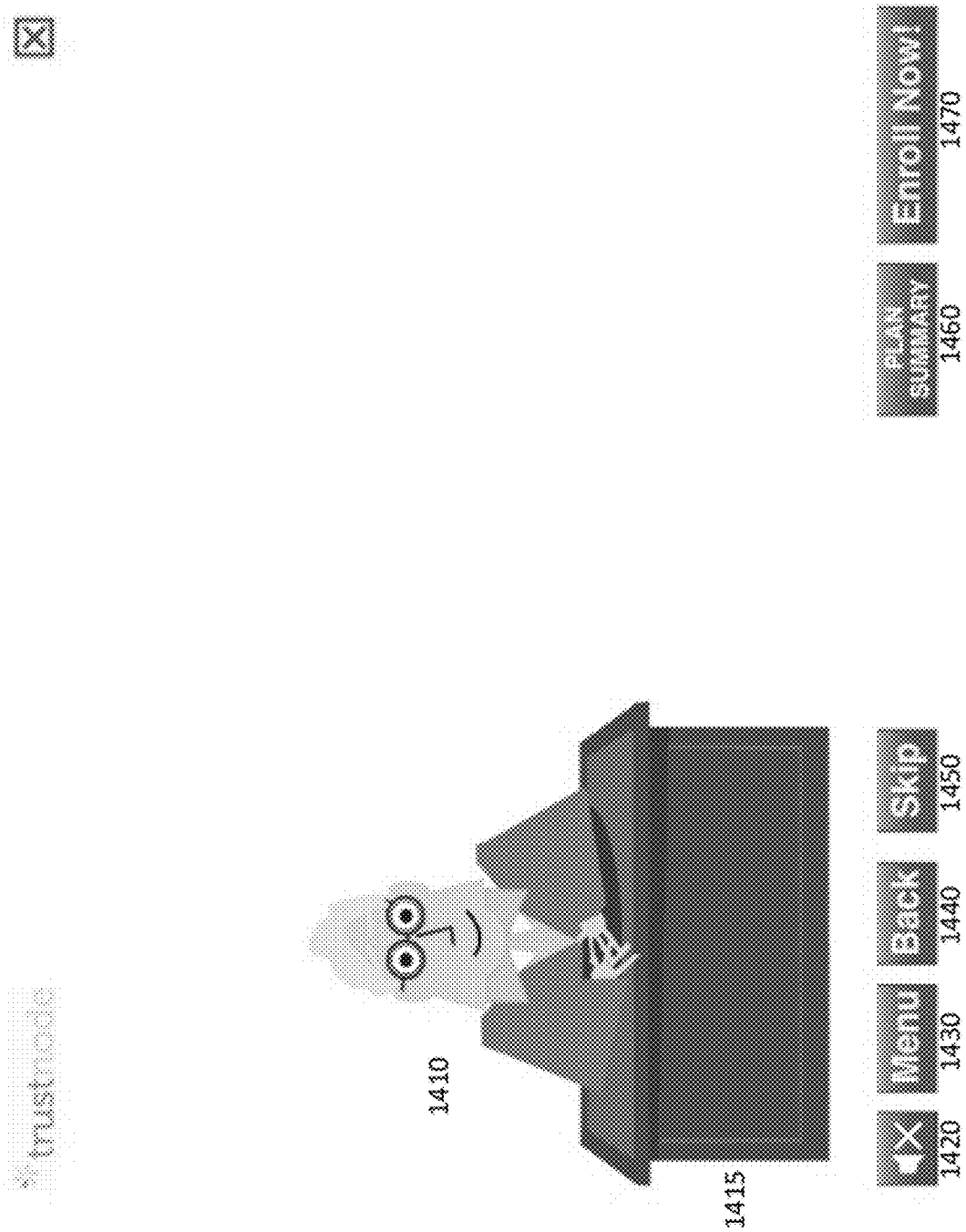

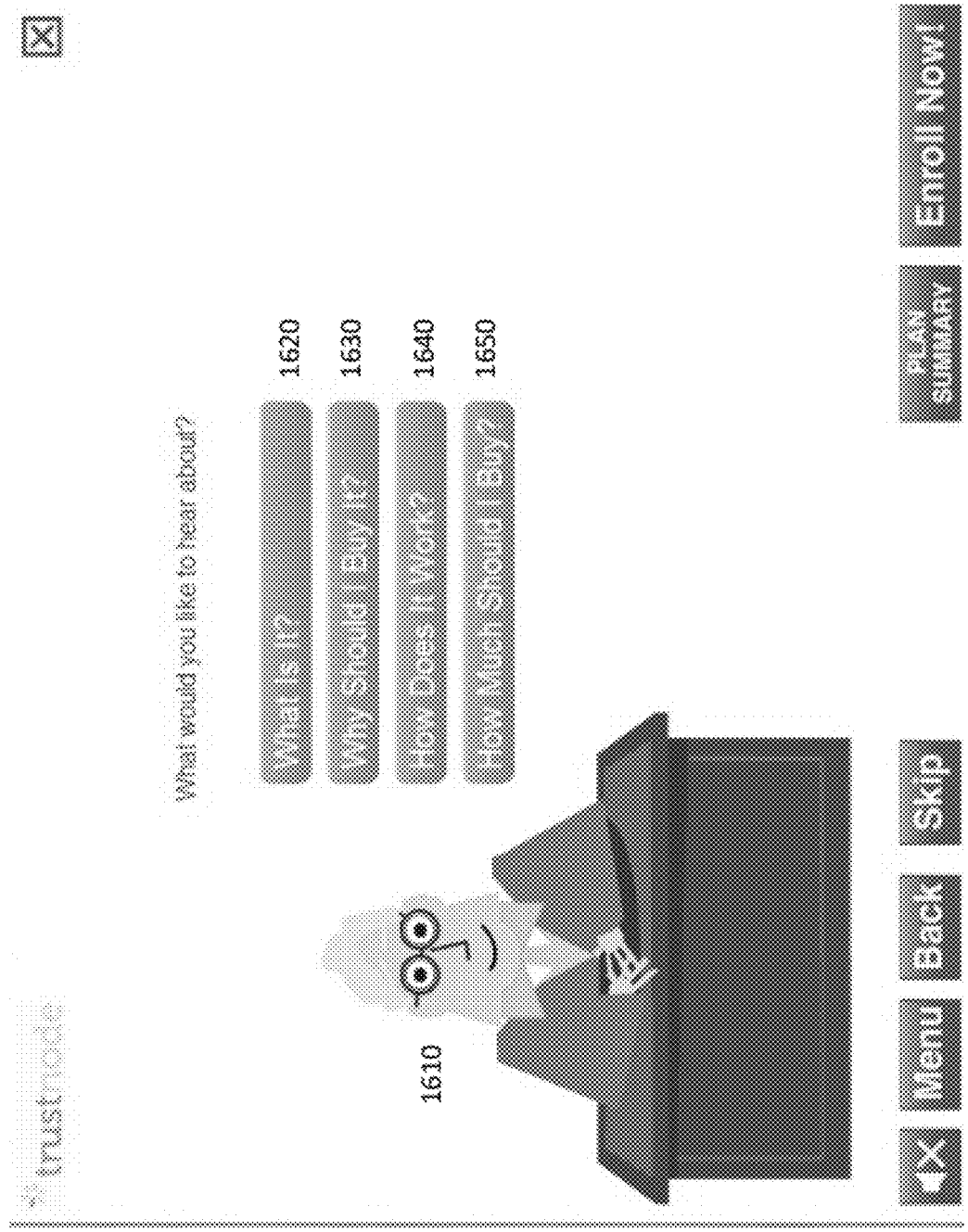

1910

1920

1930

1940

1950

1960

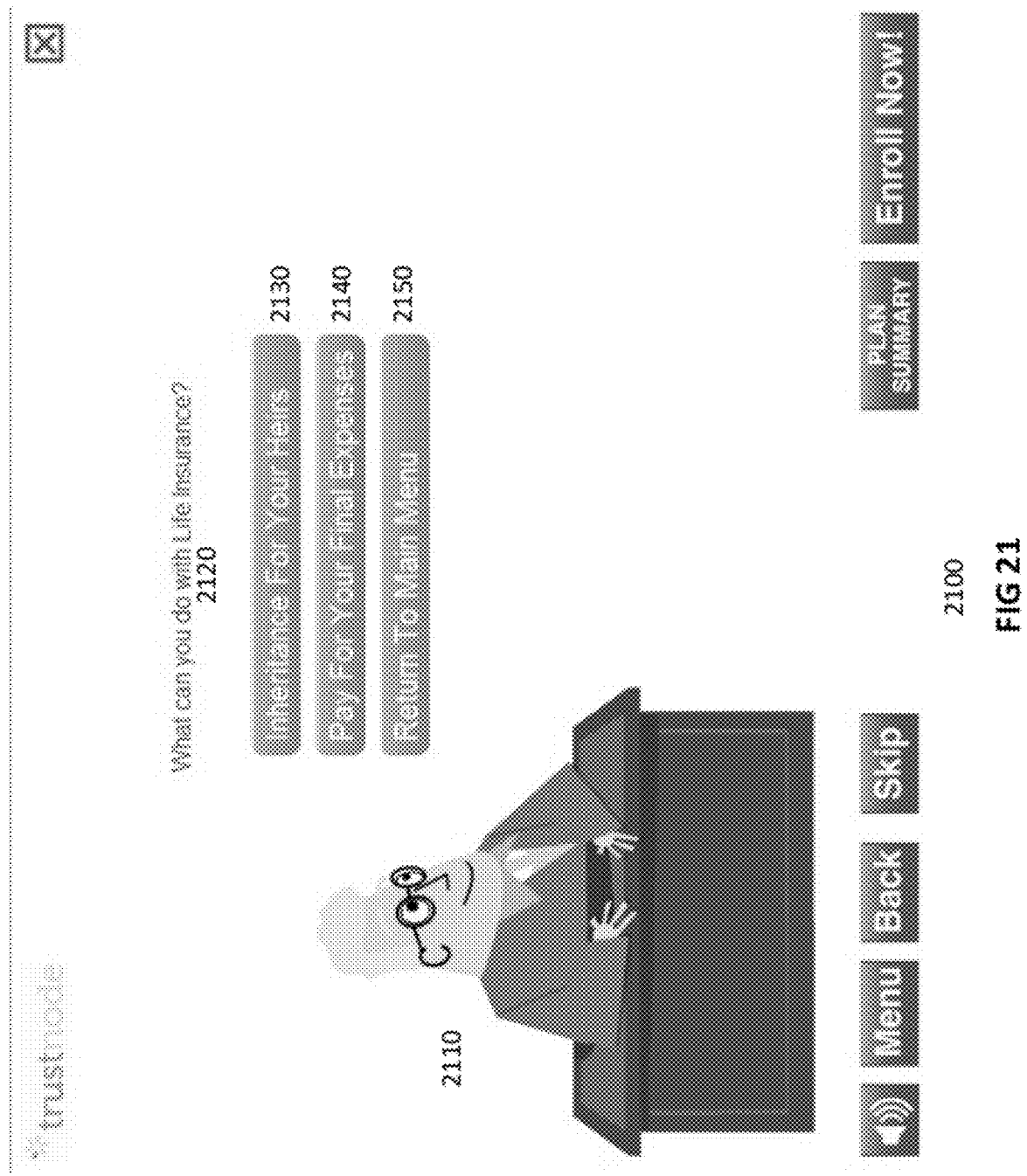

2220

2210

2310

2320

2330

2340

2350

2360

LET'S GET STARTED!

To give you an overview of the amounts available to you, I need to know your age and annual income before we begin.

2410

2420 Age: [25] ? Please enter a value between 18

2430 Annual Income: [75000] ?

2440 Family Coverage: ☑ Spouse ☑ Children ?

Back Next

Menu Back Skip Plan Summary Enroll Now!

Figure 26:
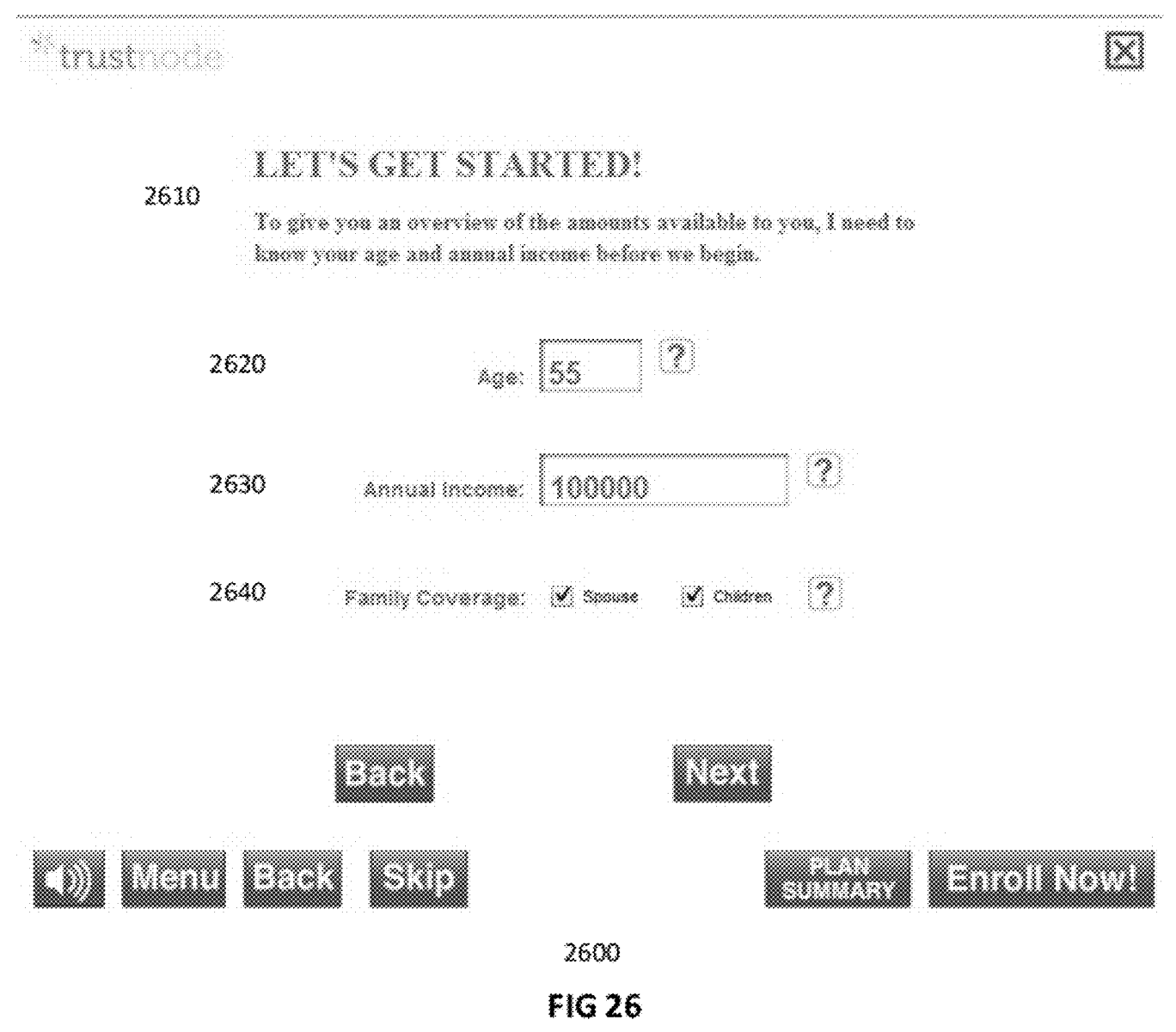

LET'S GET STARTED!

To give you an overview of the amounts available to you, I need to know your age and annual income before we begin.

2610

2620 Age: 55 (?)

2630 Annual Income: 100000 (?)

2640 Family Coverage: ☑ Spouse ☑ Children (?)

Back  Next

Menu  Back  Skip  Plan Summary  Enroll Now!

CONFIGURABLE INTERACTIVE ASSISTANT

CROSS REFERENCE TO RELATED APPLICATIONS

This application claims the benefit (pursuant to 35 U.S.C. §119(e) for provisional applications and 35 U.S.C. §120 for nonprovisional patent applications) of (i) U.S. Provisional Patent Application No. 61/289,405, filed Oct. 4, 2010, entitled "Interactive Assistant API," and (ii) U.S. patent application Ser. No. 12/433,720, filed Apr. 30, 2009, entitled "Persistent Sales Agent for Complex Transactions," each of which is incorporated herein by reference.

BACKGROUND

1. Field of Art

This application relates generally to the field of online sales and distribution systems and, in particular, to an extensible configuration tool permitting third-party customization of an interactive system that facilitates complex transactions by employing branded virtual characters that persist across multiple platforms throughout the various stages of such transactions.

2. Description of Related Art

As discussed in U.S. patent application Ser. No. 12/433,720, filed on Apr. 30, 2009, there is a need to engage consumers throughout the entirety of a complex sales and distribution process. What is needed is a system that can attract prospective customers and retain them throughout the various stages of a long and complex sales cycle. Moreover, there is a need to simplify the development process of such a system, and make it extensible via a user-friendly configuration tool that permits third-party developers to customize individual product modules, including the runtime assets contained therein.

SUMMARY

The present invention employs branded virtual characters across multiple network platforms throughout various stages of complex transactions (eg, selling insurance). These characters initially engage prospective customers on a network platform, such as a social network, and persist over time across other network platforms (eg, university and company websites) to educate consumers until they are ready to purchase—e.g., from their "trusted advisor"—particular products and services offered by various providers. Even after completing transactions, these characters continue to provide various services, such as notifying a customer whose circumstances have changed of a relevant product or service, while remaining available to answer questions and provide information upon demand. By employing a semi-automated model, the system of the present invention can answer many questions via predetermined vignettes and automated answers generated by expert systems, while still utilizing live human experts (often transparently) when necessary.

An extensible configuration tool ("Config Tool") is provided to simplify the continued development of such a system, as well as customization of individual Product Modules (e.g., a Life Insurance Module) by product and service providers (e.g., insurance companies and employers) and other third-party developers. In one embodiment, this Config Tool provides a variety of extension points that permit individual characters to be added and modified, along with their appearance and behavior (at various levels of abstraction). Moreover, the interaction among these virtual characters can also be customized, including their dialogue and interactive conversations with users, as well as with one another. Online providers of products and services can also customize the information that these virtual characters provide to prospective customers, as well as the manner in which such information is provided. The result is an application that can be highly customized by particular online providers to target specific demographic groups of prospective customers.

BRIEF DESCRIPTION OF DRAWINGS

FIG. 1a is a system diagram of one embodiment of the present invention, illustrating the multiple network platforms and interconnections among key system components that enable customers to interact with the system and engage in complex transactions with multiple service providers.

FIG. 2 is a block diagram of the "Model-View-Controller" paradigm employed throughout the system architecture of the present invention, and in particular in the development of each Element of the system.

FIG. 14 is a screen snapshot of an initial screen illustrating the user interface of one embodiment of a Life Module of the present invention.

FIG. 16 is a screen snapshot of a menu screen illustrating component Elements of one embodiment of a Life Module Template of the present invention.

FIGS. 20, 21 and 22*a-b* are screen snapshots illustrating the results of configuration (via the Config Tool) of an Element (the "Why Should I Buy It?" Element of one embodiment of a Life Module Template of the present invention) when a user selects a menu item corresponding to that Element and enters an age (55) indicating that they fall within the "Baby Boomers" demographic group.

FIGS. 24 and 25*a-b* are screen snapshots illustrating the results of configuration (via the Config Tool) of an Element (the "How Much Should I Buy?" Element of one embodiment of a Life Module Template of the present invention) when a user selects a menu item corresponding to that Element and enters data including their age (25), annual income ($75,000) and family coverage preference (spouse and children).

FIGS. 26 and 27*a-b* are screen snapshots illustrating the results of configuration (via the Config Tool) of an Element (the "How Much Should I Buy?" Element of one embodiment of a Life Module Template of the present invention) when a user selects a menu item corresponding to that Element and enters data including their age (55), annual income ($100,000) and family coverage preference (spouse and children).

DETAILED DESCRIPTION

I. General Architecture

One embodiment of the architecture of a system of the present invention is shown in FIG. 1*a*. As noted above, this system 100 employs branded virtual characters (not shown) to facilitate complex transactions among multiple service providers 110 and their customers 120 across multiple network platforms. In this embodiment, the Internet 125 is employed to facilitate the interconnection of service providers 110 and their customers 120 with the multiple network platforms on which the present invention may be deployed, including a server-based platform 130 and other network platforms (e.g., social networks) 140 on which client applications can be deployed.

It should be noted that the present invention can be deployed entirely on a single platform (e.g., a social network such as Facebook, a web server, a company's corporate server, etc) without departing from the spirit of the present invention. Moreover, the client and server hardware on which the present invention is deployed, and which service providers 110 and their customers 120 utilize to access the system, can include laptops, desktop computers, enterprise servers, mobile phones and a variety of other computing devices.

Figure 1B:
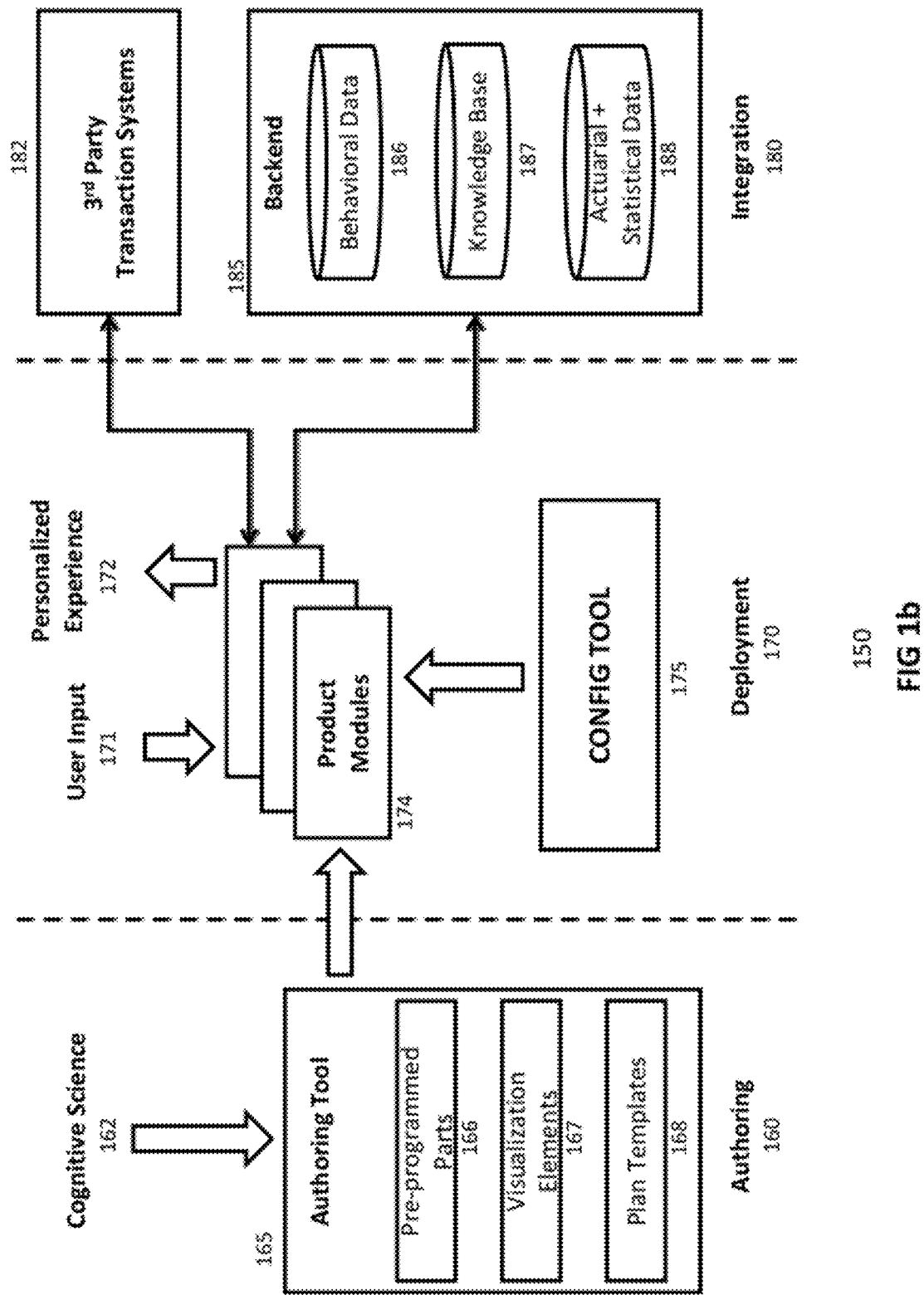
FIG. 1b is a block diagram of one embodiment of the server-based architecture of the present invention, illustrating the development and deployment of Product Modules, including integration with back-end systems and an extensible Config Tool that enables customization of various aspects of Product Modules by third-party product and service providers and developers.

FIG. 1*b* illustrates one embodiment of the server-based architecture of the present invention, centering around the Product Modules 174 with which service providers 110 and their customers 120 (shown in FIG. 1*a*) interact. System components are divided into different functional phases of the process, including the development or authoring 160, and the deployment 170, of Product Modules 174, as well as the integration 180 of these Product Modules 174 with various third-party transaction 182 and back-end database 185 systems.

Beginning with the authoring stage 160, the entire process is predicated upon various principles of cognitive science 162, as discussed in greater detail in U.S. patent application Ser. No. 12/433,720, filed Apr. 30, 2009, entitled "Persistent Sales Agent for Complex Transactions," which is incorporated herein by reference. Branded virtual characters and other programmable objects can be correlated with concerns of particular customers, based upon demographic/profile or psychographic/behavioral characteristics of those customers. Rather than simply offer prospective customers a selection of choices, the system can associate those choices with branded virtual characters and other programmable objects that represent likely concerns of customers exhibiting a particular demographic or psychographic characteristic.

For example, because younger users naturally question the need for insurance, they are more likely to select the "Why do I need insurance?" question, particularly if that question is associated with a young virtual cartoon character to which they can relate. Moreover, an animated virtual character is more engaging than a simple textual link. Similarly, a user that has already demonstrated a risk-taking tendency (eg, by previously selecting and repeatedly playing a game or other application involving high-risk behavior) is more likely to seek information relating to the consequences of risky behavior (such as the scope of coverage of a disability policy), whereas a more meticulously careful individual is more likely to seek detailed information or ask questions of a live agent.

Whatever correlations the rules dictate, the result is that prospective customers are more likely to be engaged by characters to which they can relate, and which represent associated concerns that they are likely to have, based at least in part upon their particular demographic or psychographic characteristics. Moreover, because cartoon characters mimic the way in which the human mind actually stores information (eg, by exaggerating and simplifying features, and removing extraneous detail that would be present in more "lifelike" images), they are distinctive and readily recognizable, and are thus an effective medium for communicating relatively complex educational concepts (such as insurance). For example, when consumers observe a particular character sustaining various injuries in different types of accidents, they begin to associate that character with the conceptual issue being addressed—eg, "Why do I need insurance?"

Over time, consumers build up a level of trust in these recurring characters that would not be present in a typical physical (or even online) sales scenario, particularly as they obtain information in a low-pressure sales environment. In some embodiments, these cartoon characters age over time, along with the consumer, and otherwise adapt to a particular environment. In certain embodiments, branded cartoon characters are employed intentionally to appear less human than more "lifelike" 3D avatars, which can serve to avoid false expectations of the degree of intelligence expected even from semi-automated systems. Trust can be lost quickly if too much reliance is placed on lifelike characters that are driven solely by artificial intelligence technology, as a character's lack of actual human intelligence can readily become apparent.

This process can in essence become a long-term relationship with a customer over a lifetime, in which multiple products or services are purchased over time. Moreover, one or more trusted advisors as well as other associated characters can persist throughout this long process or relationship.

An authoring tool 165 is employed to assist system developers, as well as third-party service providers and developers, with the process of authoring Product Modules 174. Certain pre-programmed parts 166 and visualization elements 167 are provided to facilitate this process, such as character libraries, standard animations, images and dialogue that pertain to specific types of products (explained in greater detail below). Prospective life insurance customers, for example, may generally have certain attributes in common, regardless of the particular service provider or life insurance policy. Individual workers face similar scenarios, depending upon their age, family situation, employment environment and a host of other demographic and psychographic data. Moreover, the details of the insurance policies themselves often have much in common. Plan templates 168 are therefore provided to facilitate the authoring process, as will also be explained in greater detail below.

Through the use of authoring tool 165, the initial development of customized Product Modules is greatly simplified. However, given the vast array of different types of product offerings that exist across various industries, third-party providers may not have sufficient time or resources to invest in custom development of each Product Module 174, particularly as their products and services evolve over time. Moreover, even after a particular Product Module is developed and deployed, there is often a need to modify the customer experience in interacting with that Product Module (e.g., due to changes in product offerings, regulatory rule changes, customer behavior, etc).

In one embodiment, third-party providers and developers can continually fine-tune and configure individual Product Modules via a Config Tool 175, both before and after deployment of a Product Module 174. Config Tool 175 will be discussed in greater detail below.

Upon deployment 170 of a Product Module 174, the system interacts with customers, seeking their input 171 in order to deliver a personalized experience 172 to each particular customer. Integration 180 with various third-party transaction systems 182, for example, enables customers to enroll in a particular insurance plan. Integration 180 with back-end systems and databases 185 provides both generic and personalized information that can be delivered to customers in many forms, often through vignettes including branded virtual characters.

For example, a trusted insurance agent character might interact with customers regarding a particular insurance plan by speaking audio dialogue, accompanied by textual and visual data, along with animations employing other virtual characters, all in an effort to educate prospective customers regarding various aspects of that insurance plan. By accessing various databases 185, the system will have access not only to a relevant knowledge base 187 (containing, for example, details of a particular insurance plan), but also to behavioral data 186 and actuarial and statistical data 188 relating not only to people generally, but also to people having similar demographic profiles or exhibiting similar behaviors. This information also includes the behavior of prospective and actual customers with respect to the system itself—e.g., which options they select, which products they purchase and a host of other behavioral and statistical data.

Before discussing details of Config Tool 175, and the manner in which third-party providers and developers can configure and customize various components of Product Modules 174, it is helpful to examine the architecture and data model underlying the system itself, and the generation of these components. In one embodiment of the present invention, third-party providers and developers can utilize Config Tool 175 to access, configure and customize various core components used to construct a Product Module 174. Additional custom components can also be added when the Product Module 174 is compiled, or even dynamically at runtime. A consistent syntax in the data formats facilitates the construction of "editors" (e.g., visual editors) used to develop core and custom components.

A Product Module 174 is divided into components which are each composed of smaller units, called "Models", "Views", and "Controllers." The "Model-View-Controller" paradigm is a common way of breaking apart the data representation (Model), the module's user interface (View), and the code which mediates between them and the user (Controller).

Controllers determine how a Product Module 174 progresses over time, passing Events (messages to invoke actions) to other Controllers or to Views, which are the visual elements of a module. Views respond to Events, while Models contain small pieces of data, such as preferences, recent user history and visual settings. Controls are parts of a View, such as a UI (user interface) widget. Forms are special Controls that can contain one or more other Controls and which convey data to users.

Figure 3:
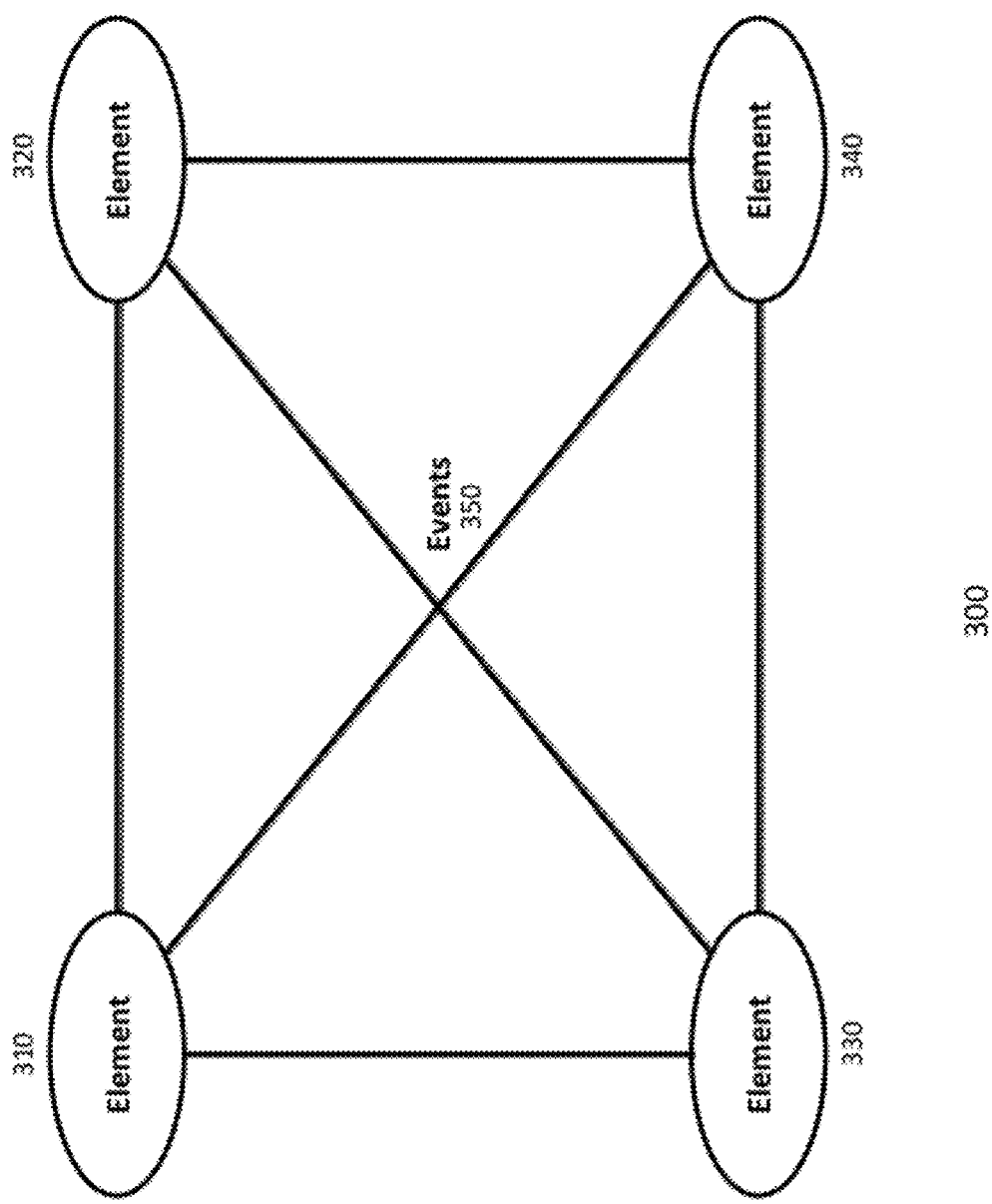
FIG. 3 is a block diagram illustrating the interaction among various Elements of a system Module, triggered by particular Events.
Figure 4:
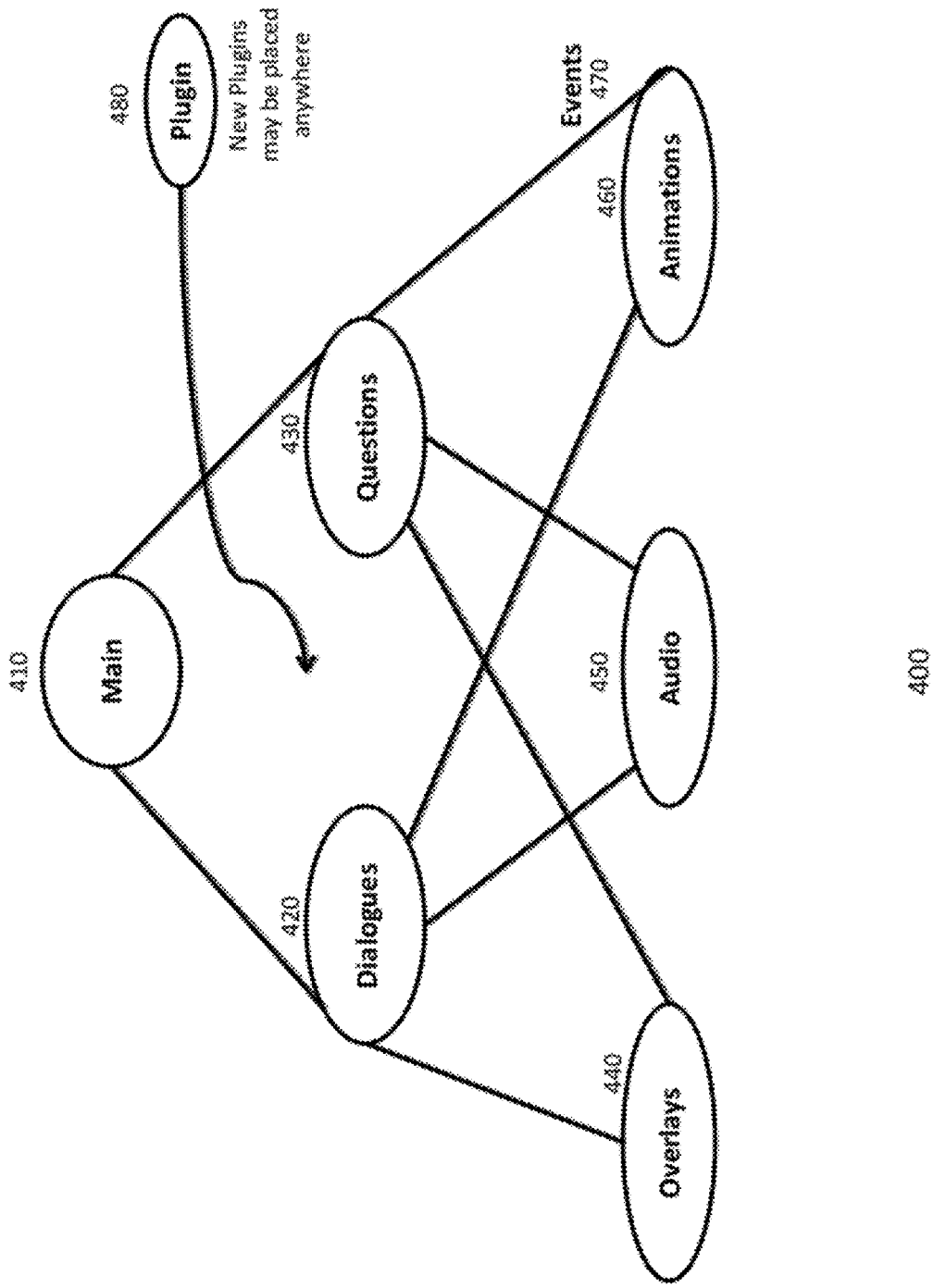
FIG. 4 is a block diagram illustrating one embodiment of the interaction among various system Elements, including a Main Controller that invokes certain Dialogues (e.g., explanations of concepts to users) and Questions (e.g., to elicit information from users), and employs various visual elements or Overlays (e.g., characters, illustrative images, etc.) accompanied by Audio and Animations (e.g., an animated character voicing the Dialogues and Questions to users).

A simple diagram of an Element 200 or Plugin of the system is illustrated in FIG. 2. The Controller 210 scripts dictate the interaction with users, and how data (Model 220) is extracted via the UI elements 230 (Forms, Views and Controls). Multiple Elements (e.g., 310, 320, 330 and 340) then interact with one another, triggered by various Events 350, as illustrated in FIG. 3. A more concrete example is illustrated in FIG. 4, in which a particular Element, such as a Main Controller 410, invokes certain Dialogues 420 (e.g., explanations of concepts to users) and Questions 430 (e.g., to elicit information from users), each of which can include various visual elements or Overlays 440 (e.g., characters, illustrative images, etc.) accompanied by Audio 450 and Animations 460 (e.g., an animated character speaking the Dialogues and Questions to users). While under the control of Main Controller 410, various Elements of FIG. 4 may also be triggered via predefined Events 470. Moreover, additional Elements or Plugins 480 may be added to the system at any time, e.g., via the Config Tool (not shown).

In one embodiment, the following set of six core components are available to third-party providers and developers:

Step

Dialogue

Question

Response

Overlay

Form (including NumberForm, TextForm, RadioForm and EmptyForm)

Steps (not shown in FIG. 4) are subsections of a script (such as Main Controller 410), representing a distinct "scene" or idea. In this embodiment, a Step includes at least one Question and may also contain one or more Dialogues. For example, a simple Step might include a single Dialogue and one Question which has two possible Responses (also not shown in FIG. 4), and would look like the following:

```xml
<object type="com.trustnode.assistant.models.Step">
    <property name="id" value="2"/>
    <property name="preDialogues">
        <array>
            <object type="com.trustnode.assistant.models.Dialogue">
                <property name="animationUrl" value="assets/animations/scene3.swf"/>
                <property name="lines">
                    <array>
                        <object type="com.trustnode.assistant.models.Line">
                            <property name="text">
                                <string>Some basic dialogue.</string>
                            </property>
                        </object>
                    </array>
                </property>
            </object>
        </array>
    </property>
    <property name="question">
        <object type="com.trustnode.assistant.models.Question">
            <property name="form">
                <object type="com.trustnode.assistant.controls.RadioForm">
                    <property name="autoPosition" value="true"/>
                </object>
            </property>
            <property name="responses">
                <array>
                    <object type="com.trustnode.assistant.models.Response">
                        <property name="text" value="Answer 1 (leads to next)"/>
                        <property name="next" value="3"/>
                    </object>
                    <object type="com.trustnode.assistant.models.Response">
                        <property name="text" value="Answer 2 (leads to next)"/>
                        <property name="next" value="3"/>
                    </object>
                </array>
            </property>
        </object>
    </property>
</object>
```

Dialogues 420 are non-interactive sets of animation, audio and text. Dialogues 420 typically are used to illustrate a point or educate the user. Any number of characters may talk during a Dialogue 420, but Harvey (the primary "virtual agent" in this embodiment) usually is the one to talk to the user or narrate. Dialogues 420 may appear before a Question 430 or after a Response. Another example of a simple Dialogue 420 is the following:

```xml
<object type="com.trustnode.assistant.models.Dialogue">
    <property name="animationUrl" value="assets/animations/scene1.swf"/>
    <property name="lines">
        <array>
```

-continued

```xml
            <object type="com.trustnode.assistant.models.-
Line">
                <property name="text">
                    <string>Hi, I'm Harvey Keck, your
                        virtual insurance guide.</string>
                </property>
            </object>
        </array>
    </property>
</object>
```

Questions 430 prompt users for input (e.g., Responses). In one embodiment, a Form may contain an animation and audio representing an audio cue to the user (e.g., Harvey asking a question). Each Question 430 contains a Form and any number of Responses, such as the following:

```xml
<property name="question">
    <object type="com.trustnode.assistant.models.Question">
        <property name="animationUrl" value="assets/animations/scene2.swf|blue"/>
        <property name="lines">
            <array>
                <object type="com.trustnode.assistant.models.Line">
                    <property name="text">
                        <string>FINALLY! A question!</string>
                    </property>
                </object>
            </array>
        </property>
        <property name="form">
            <!--
```

-continued

```
                RadioForm can be auto-positioned, which
                means that the responses will be stacked
                predictably. You can still position them
                relatively.
            -->
            <object type="com.trustnode.assistant.controls.RadioForm">
                <property name="autoPosition" value="true"/>
            </object>
        </property>
        <property name="responses">
            <array>
                <object type="com.trustnode.assistant.models.Response">
                    <property name="text" value="Start from Beginning"/>
                    <property name="next" value="1"/>
                </object>
                <object type="com.trustnode.assistant.models.Response">
                    <property name="text" value="Go to the next step"/>
                    <property name="next" value="2"/>
                </object>
            </array>
        </property>
    </object>
</property>
```

A Response represents a potential way a user might respond to a Question 430. A Response can include a range of user responses, or a specific response. If the user fails to respond, a default response can be employed. Each Response ends with a link to a "next" desired Step.

Overlays 440 are animations that can be substituted for the default animations provided by the system—e.g., to allow more customizability, or to add additional characters to a scene without recompiling any code. The use of "layers" allows for Overlays 440 to be placed in front of or behind other objects. Default Overlays 440 are used to place UI elements on the screen. In one embodiment, an Overlay 440 can be displayed for a specified duration of time or number of Steps, or indefinitely. Following is an example of a set of default Overlays 440:

```
<property name="defaultOverlays">
    <array>
        <object type="com.trustnode.assistant.models.Overlay">
            <property name="animationUrl"
value="assets/animations/DEFAULT_BACKGROUND.swf"/>
            <property name="removeAfterComplete"
            value="false"/>
            <property name="removeAfterStopped"
            value="false"/>
            <property name="layerName" value=
            "backgrounds"/>
        </object>
        <object type="com.trustnode.assistant.models.Overlay">
            <property name="animationUrl"
            value="assets/animations/ui.swf"/>
            <property name="removeAfterComplete"
            value="false"/>
            <property name="removeAfterStopped"
            value="false"/>
        </object>
    </array>
</property>
```

Forms are a set of UI Controls that (in one embodiment) are displayed during a Question 430. They allow the user to input a Response that gets parsed to change the flow of the module. Forms can be customized to allow potential new ways for the user to respond. For example, one could create an "Upload Form" to allow a user to upload a photo or scans of insurance information. Another custom Form could be a "plan calculator" which could allow for a sophisticated multi-Step Question 430 which could calculate premiums for a user.

As will be discussed below with respect to Config Tool 175, the present invention is extensible at a variety of "extension points" including Controllers (e.g., to change the control flow of a module), Views/Controls/Forms (e.g., to add new UI elements and new ways for users to respond), Models (e.g., to store new types of data), Styles (e.g., custom CSS styles), and Tags (e.g., custom XML tags to add new features or simplify data representation). In one embodiment, use of the Parsley Framework also provides various extension points without accessing internal source code.

Plan Templates are employed to faciliate rapid customization of individual aspects of plans (e.g., the amount of the deductible for a particular insurance policy). Module Templates permit configuration and customization of various different component Elements of a Product Module, beyond the design of individual product or service plans. Moreover, "Presets" enable third-party providers and developers to group multiple different configurations (e.g., swappable Elements), thereby further simplifying the process of configuring and customizing a Product Module. Each of these concepts is discussed in greater detail below.

II. Config Tool

FIGS. 5-9 illustrate one embodiment of the user interface of the Config Tool 175 of the present invention, including various customizable aspects of Product Modules, in this case insurance-related products. It should be appreciated that many other aspects of Product Modules (across various industries) can be configured and customized by third-party providers, companies and developers through the user interface of a tool such as Config Tool 175, as well as via an Application Programming Interface (API) that provides third-party software access to such functionality.

Figure 5:
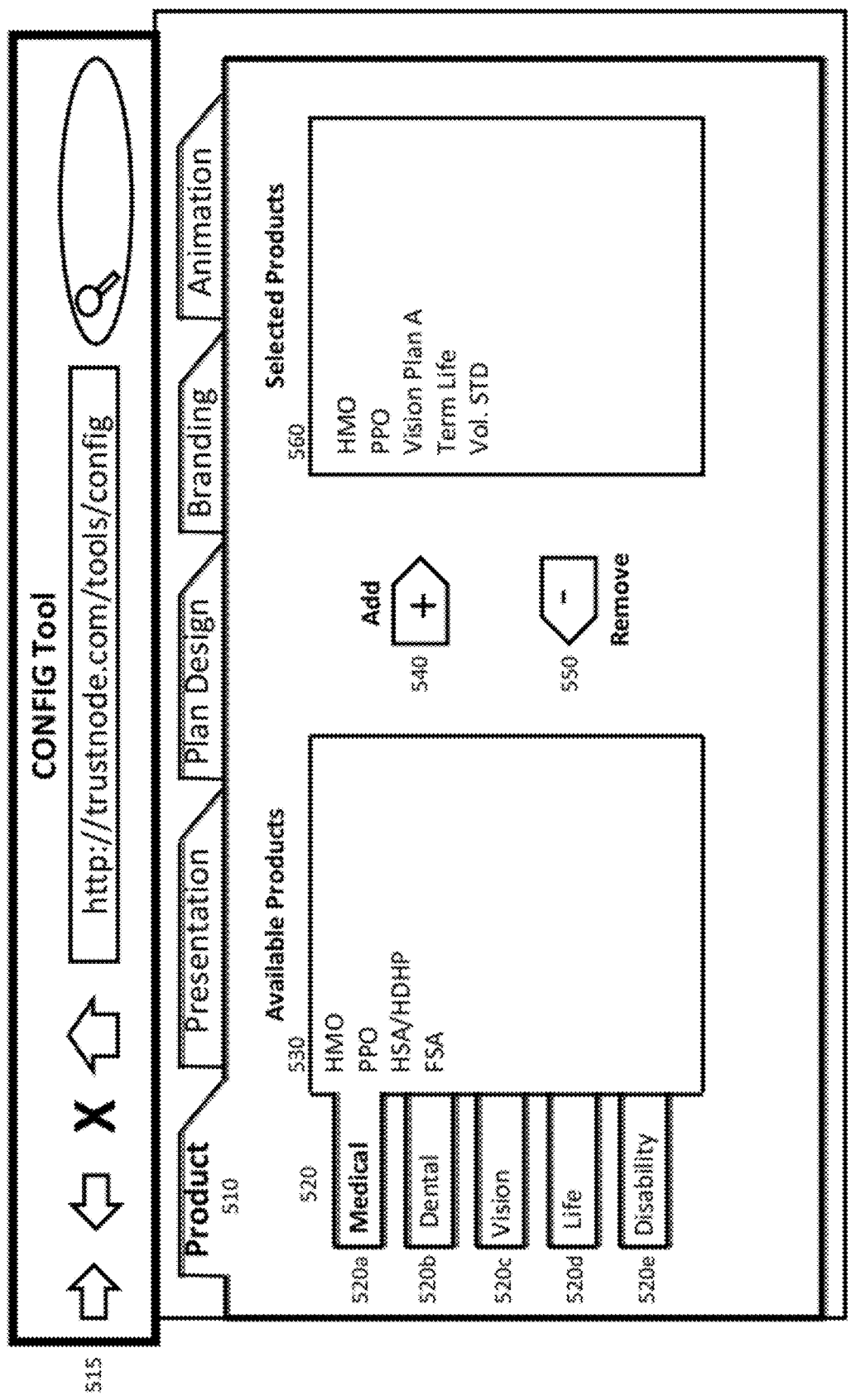
FIGS. 5-9 are screen snapshots illustrating one embodiment of the user interface of the Config Tool of the present invention, including various customizable aspects of Product Modules.

The screen snapshot in FIG. 5 illustrates the UI 500 of Product Tab 510 of Config Tool 175, presented in the window of a web browser (with standard web browser controls 515 in this embodiment. A user (e.g., a third-party insurance provider), upon selecting a product category 520 such as Medical products 520a, is presented with a list of available products 530 from which to choose, all of which fall under the Medical products 520a umbrella. In this embodiment, available products 530 encompass all of the medical products 520a offered by the provider via this system.

Note that an individual Product Module might include one or more of these products or plans, both within and across different product categories 520. Regardless of the grouping of products within a Product Module, Config Tool 175 permits users to customize (in this embodiment) certain aspects of individual products or plans, as well as more global aspects within and across Product Modules. In one embodiment, each product category 520 corresponds to a Product Module. For example, a Medical Module might include one or more medical products selected from among the list of available products 530 (but no products from other non-medical categories, such as dental, vision, etc).

The purpose of UI 500 is to enable a user/provider to determine which products to include for a particular deployment. For example, an insurance provider might offer both HMO and PPO products to employees of one particular company, but only HMO products to employees of another company. In the example illustrated in FIG. 5, the user has previously selected both HMO and PPO products from the list of available products 530, and added them (e.g., via Add button 540) to the list of selected products 560 to be included in this deployment. Similarly, Remove button 550 may be used to remove a product from the list of selected products 560. In other embodiments, a product might only be visible in either the list of available products 530 or selected products 560 (rather than always remaining visible in the list of available products 530). This is purely an implementation decision.

Note that the list of selected products 560 also includes other products outside of the Medical category 520*a*. For example, no products have yet been selected from the Dental category 520*b*, while Vision Plan A was previously selected from Vision category 520*c*. Similarly, Term Life was selected from Life category 520*d*, while Vol STD was selected from Disability category 520*e*.

Figure 6:
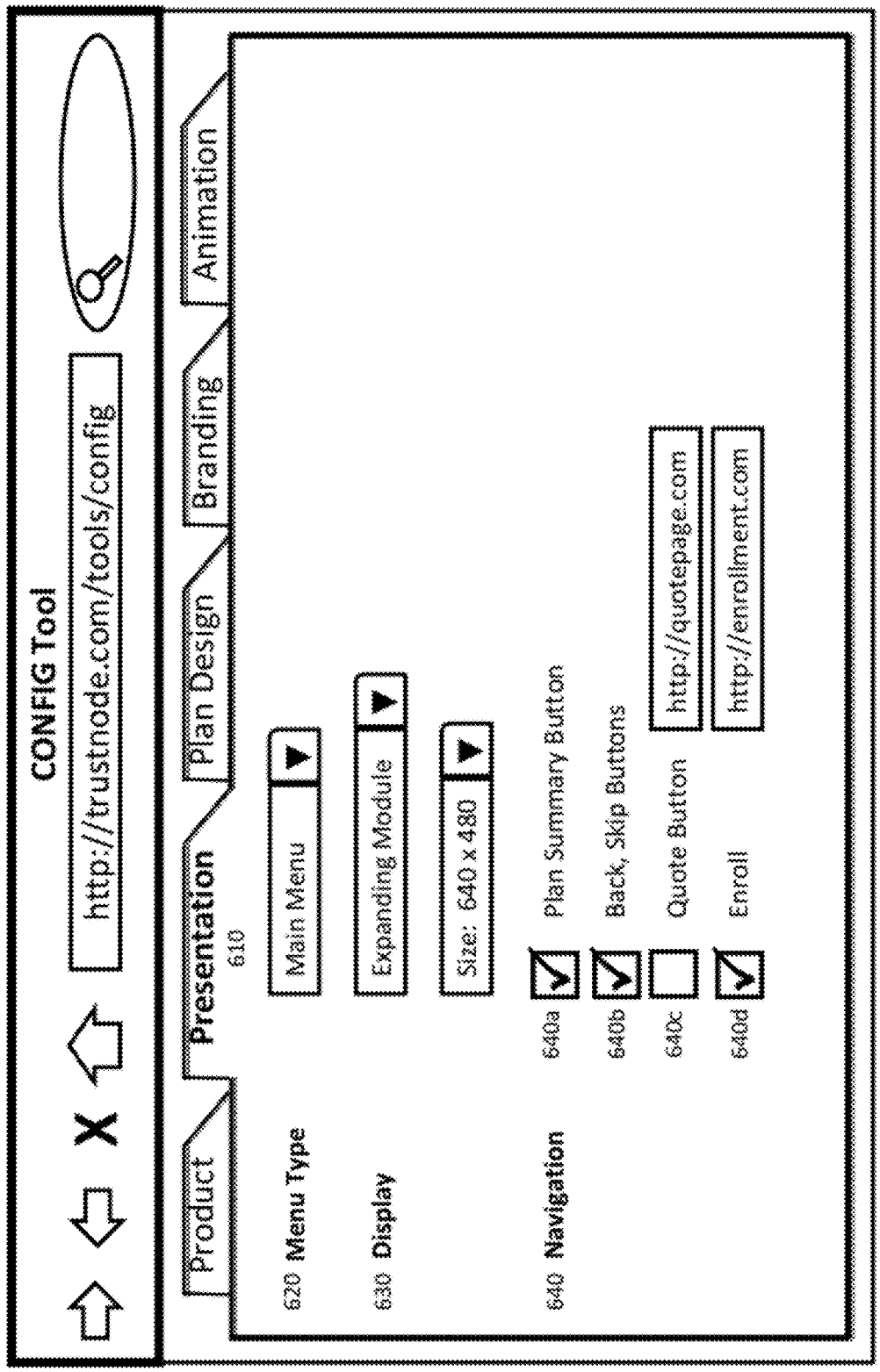

Having selected which of the available products 530 across the various product categories 520 to include in a particular deployment, a user/provider may then configure various global presentation-related aspects for one or more Product Modules, as shown in FIG. 6, which illustrates one embodiment of a Presentation tab 610 of Config Tool 175. In one embodiment, UI 600 assumes that a particular Product Module has already been selected. In other embodiments, UI 600 could include a list of Product Modules (or individual products or plans within a Product Module) to which the presentation-related configuration would apply.

In the embodiment illustrated in FIG. 6, a user can select from among multiple Menu Types 620, including the "Main Menu" configuration shown therein. For example, as will be illustrated below with respect to a sample Life Module, a "Main Menu" option may be used to combine multiple Product Modules into a "Menu Module" to permit navigation among different product offerings. Other options can include different menu titles, different sets of menu items, or various different levels of menus and sub-menus. Additional Display options 630 are provided, such as whether the Product Module is an "Expanding" Module as well as the size of each screen (e.g., a 640×480 window). Moreover, various Navigation options 640 are included, such as a Plan Summary button 640*a* (to enable users to see summary information regarding a particular insurance product or plan), Back and Skip buttons 640*b* (to enable users to repeat or skip certain Elements of a Product Module, such as section of Dialogue), a Quote button 640*c* (to enable users to obtain an immediate quote for a particular insurance product or plan, based upon information previously provided—e.g., by redirecting users to a particular URL) and an Enroll button 640*d* (to enable users to enroll in a provider's plan—e.g., by redirecting users to a particular URL). These options will be illustrated below with respect to a sample Life Module. It should be noted that these redirected URLs (with respect to the Quote 640*c* and Enroll 640*d* buttons) are utilized in conjunction with one embodiment of the integration 180 of third-party transaction systems 182 (as discussed above with respect to FIG. 1*b*) into the present invention.

Figure 7:
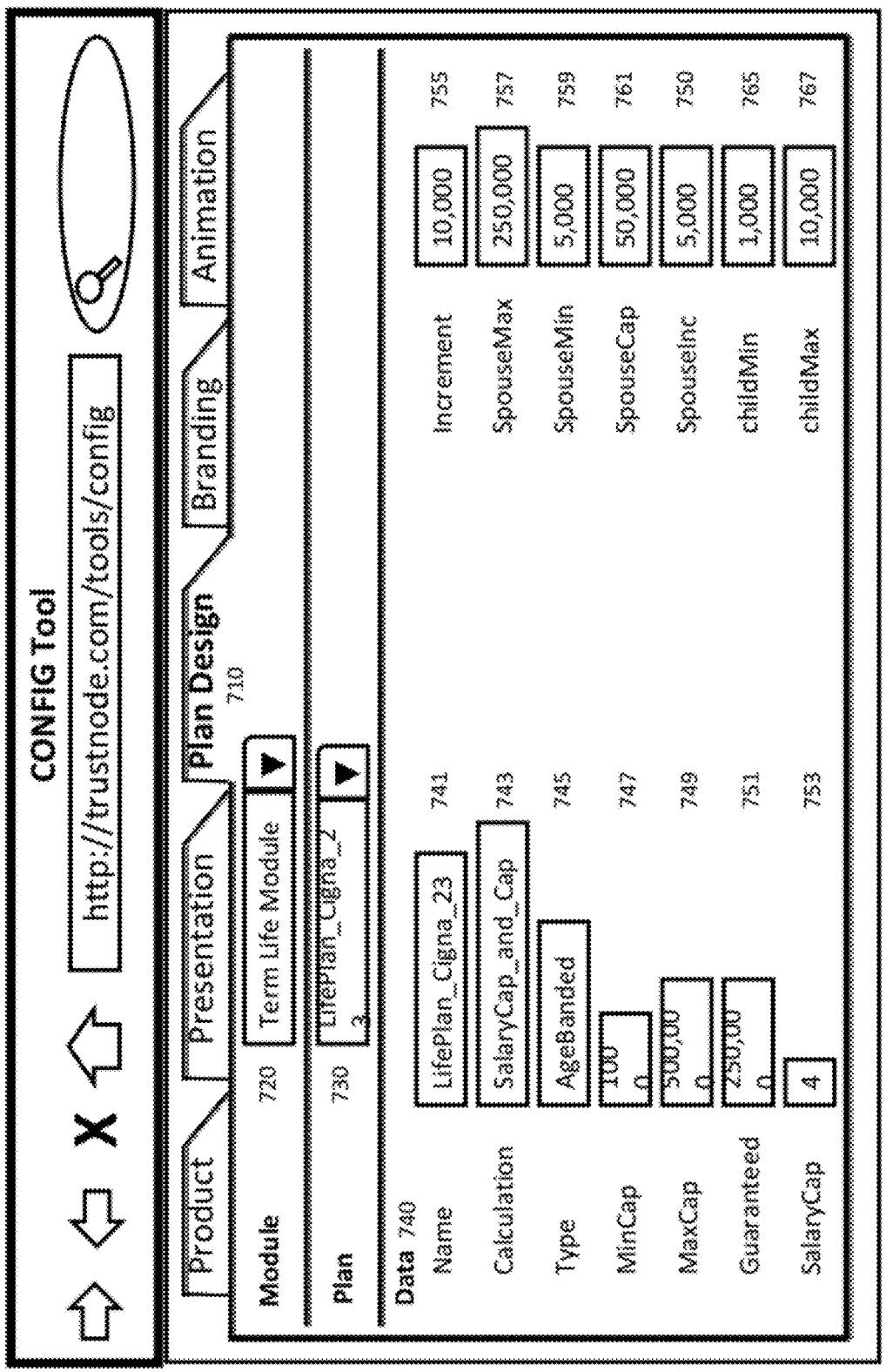

Turning to FIG. 7, UI 700 illustrates one embodiment of a Plan Design tab 710 of Config Tool 175. A user/provider first selects a Product Module 720, e.g., a Term Life Module, and a particular product or plan 730, e.g., the "LifePlan_Cigna_23," included within that Term Life Module. In one embodiment, a user/provider would (e.g., based upon information associated with the user's login credentials) have access only to particular Product Modules and products/plans for which that user/provider was authorized. This enables multiple different third-party providers to utilize Config Tool 175, but see only their own products/plans. Moreover, even within a particular provider, certain persons might be authorized to see different subsets of the Product Modules and products/plans.

Having selected a particular Product Module 720 and plan 730, a user/provider could then configure a variety of data 740 associated with that plan 730. As noted above, many products or plans (and/or categories of plan designs) have a great deal of similarity with one another. By presenting these common data elements, different providers can easily customize this data to reflect the specific details of their plans.

For example, in one embodiment, data 740 includes not only the Name 741 of the plan, but also the Calculation 743 employed (e.g., via a calculator widget with an overall cap on the coverage amount, as well as a cap on the customer's salary), including its Type 745 (e.g., an "age-banded" calculation offering different costs and benefits based on the age range of the customer). In addition, amounts can be entered for Minimum 747 (e.g., 1000) and Maximum 749 (e.g., 500,000) coverage Caps, Guaranteed amounts 751 (e.g., 250,000), a particular level 753 (e.g., 4) of Salary Caps, and an increment 755 (e.g., 10,000) amount separating the different coverage levels. Finally, similar data 740 can be specified for family members, such as spouses (Maximum 757, Minimum 759, Cap 761 and Increment 763) and children (Minimum 765 and Maximum 767). The structure of Module Templates and Plan Designs will be discussed in greater detail below in order to provide a context in which the configuration and customization of this plan data 740 can be better understood.

Figure 8:
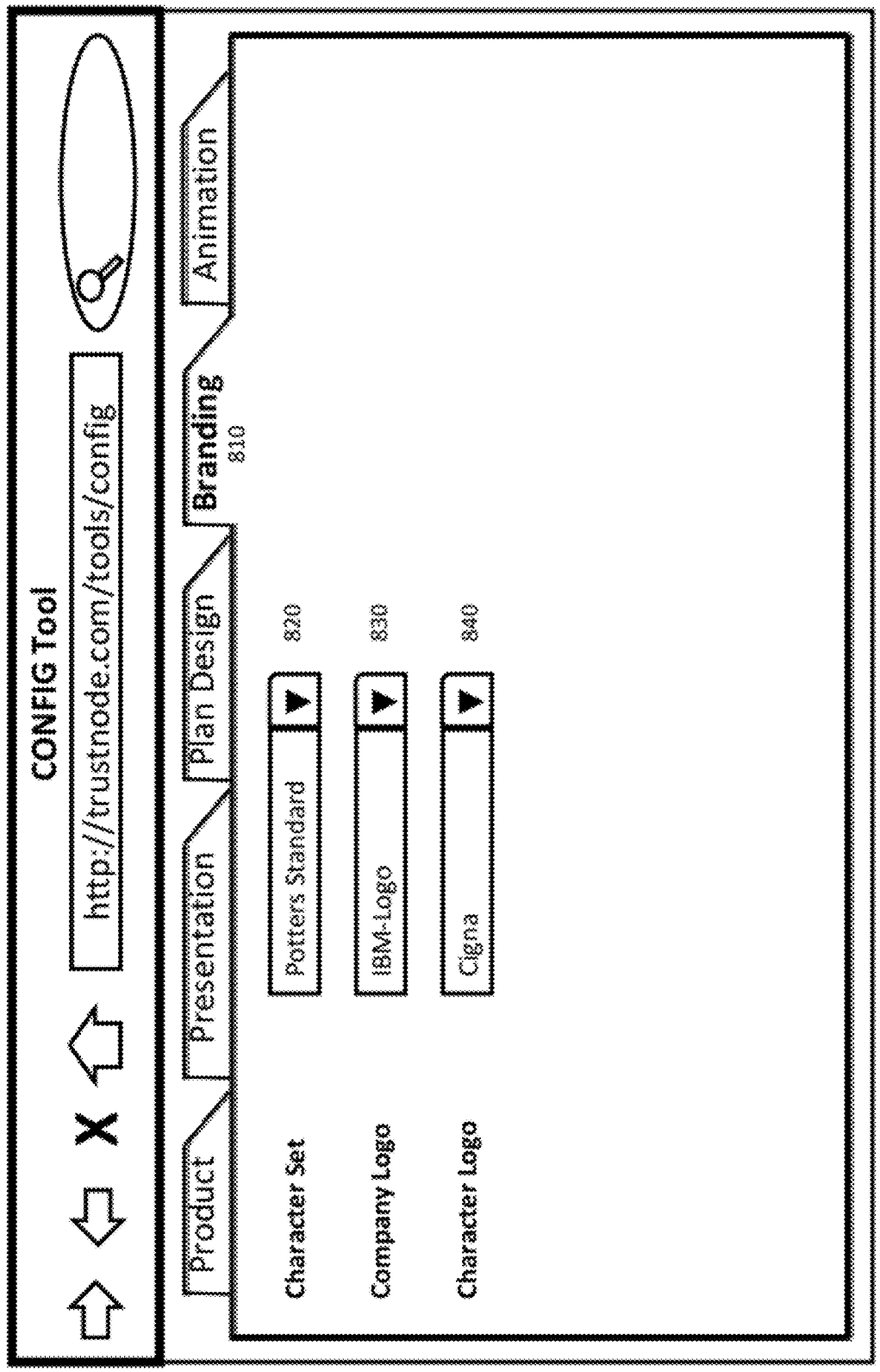

Turning to FIG. 8, UI 800 of Branding tab 810 of Config Tool 175 illustrates one embodiment of a mechanism for enabling different users/providers (or perhaps corporations offering products from one or more providers) to differentiate themselves by branding different aspects of Product Modules. For example, although a standard set of characters 820 is included by default (e.g., Harvey Keck, the trusted insurance advisor, along with the Potter family, representing a variety of different family members with which prospective customers can identify), a particular provider might desire to specify its own Character Set 820. These custom characters serve not only to differentiate that provider (or corporation) from its competitors, but might also enable the provider or company to target particular customers, based on industry, demographics, etc., by selecting characters having attributes (appearance, behavior, etc) with which those desired customers might better identify. A tool for building custom characters from common component parts is also included and discussed in greater detail below.

In addition to branding the characters themselves, a user/provider can also select from among various Company 830 and Character 840 logos that can be incorporated within Product Modules at various points, depending upon the design of Module Templates and their component Elements, as discussed in greater detail below.

Figure 9:
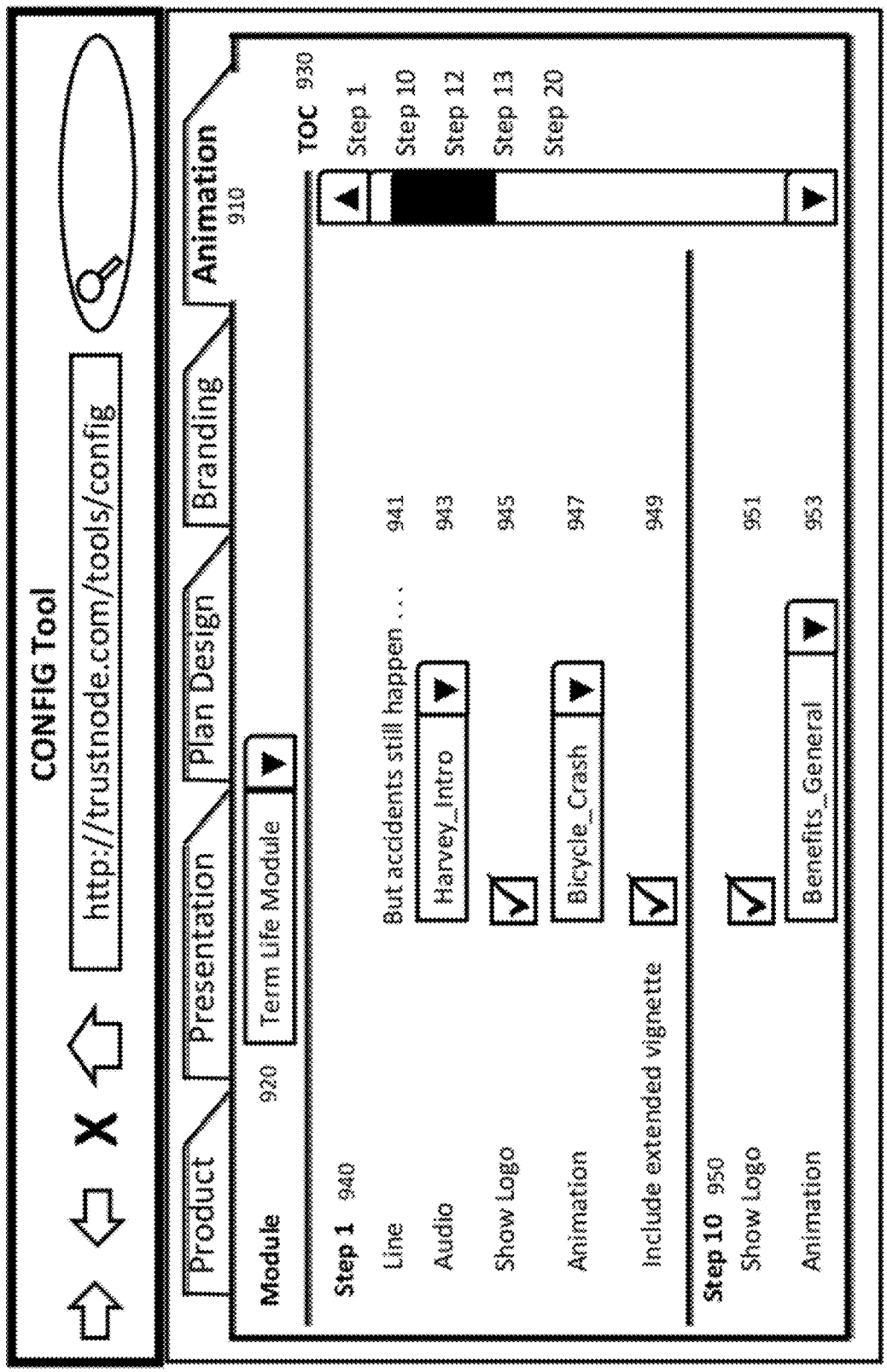

Finally, turning to FIG. 9, UI 900 of Animation tab 910 of Config Tool 175 illustrates the many different aspects of a Product Module (Term Life Module selected via Module dropdown 920) that can be configured and customized. In one embodiment, a Table of Contents (TOC 930) is provided to enable a user/provider to select different "scenes" or component Steps of Term Life Module 920 to configure. As noted above (and discussed in greater detail below), when a Module Template is designed, individual Elements can be grouped together into a Step, including for example some Dialogue (text, audio, etc), Questions, and Animations (including logos and other background visuals).

In this example, Step 1 940 of TOC 930 has been selected, enabling a user/provider to edit or select the Line of text 941 that will be displayed initially when Term Life Module 920 is launched. In addition, the accompanying initial Audio 943 (e.g., an introductory speech by trusted insurance advisor Harvey Keck) and associated Animation 947 (e.g., a bicycle crash animation referenced by Harvey) can be selected from among various choices, with the previously selected Logo either shown or hidden via checkbox 945. Another option might include an extended vignette (via checkbox 949), such as a longer animation with additional audio, text, etc.

Similar configuration of subsequent Steps (e.g., Step 10 950) is also shown, including checkbox 951 to show or hide the previously selected Logo, and dropdown 953 to select the desired Animation (e.g., illustrating the General Benefits of Term Life Module 920). In this manner, a wide variety of different Elements of each Product Module can be configured and customized. Of course, certain levels of customization will require use of Authoring Tool 165 (e.g., creating a completely new Animation), but many of the most frequently desired modifications can be incorporated into Config Tool 175 as required by the demands of third-party providers, corporations and other customers.

III. Configurable Product Modules, Templates and Component Elements

Figure 10:
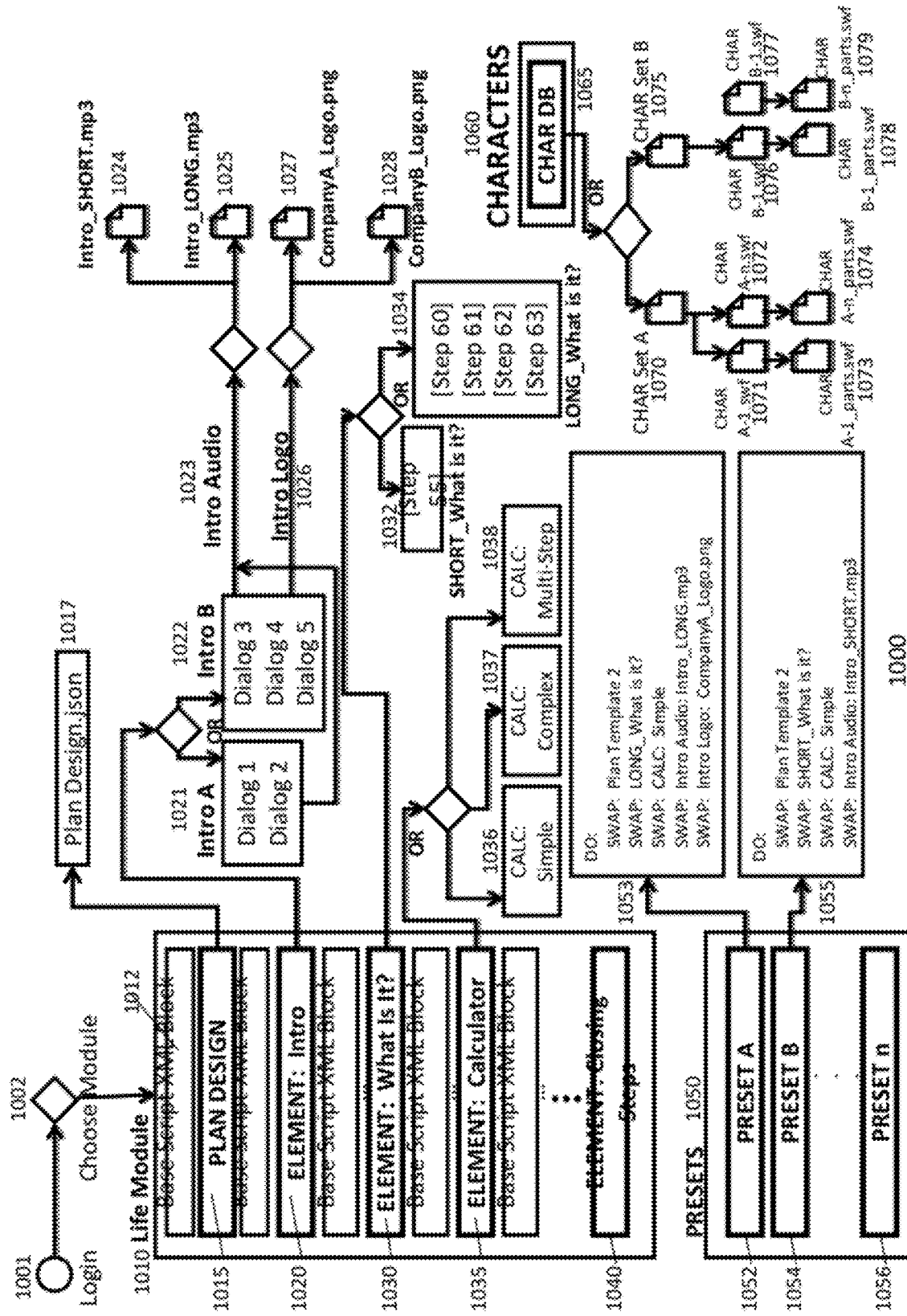
FIG. 10 is a flow diagram that illustrates one embodiment of the dynamic flow among various components of a Module (Life Module) of the present invention, including components of a Life Module Template that can be customized or swapped for one another via the Config Tool.

Having discussed the user interface and various features of Config Tool 175, it is helpful to understand the underlying structure of Product Modules during which these configurable components are developed. As noted above, Module Templates facilitate the development of Product Modules sharing many common Elements, while Plan Designs also include Plan Templates for similar reaons. FIG. 10 illustrates one embodiment of the dynamic runtime flow 1000 among various components of a Product Module (in this case a Life Module including one or more life insurance products or plans) of the present invention. These Elements and their components can be developed with Authoring Tool 165, and then customized and swapped for one another via Config Tool 175 both before and after deployment (even during runtime in one embodiment) of the Product Module.

Once the Life Module is deployed, prospective customers are authenticated by logging into the system (Login 1001) and selecting a Product Module 1002 (in this case, a Life Module including a particular life insurance plan). A block diagram of a Life Module Template 1010 illustrates key component Elements through which prospective customers can navigate. The interactive flow is determined by the logic of Controllers, shown in this embodiment as multiple Base Script XML Blocks 1012, which include sequential, conditional and event-based logic associated with individual Elements or groups of Elements, and initiated by a "main" Controller (not shown) when the Program Module is launched.

A key Element of Life Module Template 1010 is Plan Design Template 1015 which in this embodiment employs a JavaScript Object Notation (JSON) script 1017 (for representing simple data structures and arrays) to define the various data components of the life insurance plan offered to prospective customers. The components of this plan, including a Plan Template, are discussed in greater detail below with respect to FIG. 11. Other Elements of Life Module Template 1010 draw upon the components of Plan Design Template 1015 to educate prospective customers with respect to various aspects of the life insurance plan.

Intro 1020 is the initial Element with which prospective customers interact. In this example, two different introductory vignettes are included—Intro A 1021 (including two Dialogue components) and Intro B 1022 (including 3 Dialogue components). Each Dialogue component might include one or more lines of spoken dialogue. Referring back to Animation tab 910 of Config Tool 175 shown in FIG. 9 above), a provider might select one of these Intro choices using Config Tool 175, depending upon a variety of factors (type of industry, corporate employer, customer demographics, prospective customer behavior, sell-thru, etc.). In other embodiments, additional and more complex choices can be added, and at various different levels of granularity (e.g., an entire Element, a Step within that Element, a single Dialogue, Audio or Animation, etc).

At runtime, the system displays the selected Intro Element 1020, and plays the associated Intro Audio 1023, which in this example includes a choice of a short 1024 or long 1025 version (implemented as MP3 audio files). Note that, in this example, Intro B 1022 also includes the display of an associated Intro Logo 1026, which itself can be tailored to different companies, illustrated here as a Company A Logo 1027 and a Company B Logo 1028. Note that such branding could be selected via Branding tab 810 of Config Tool 175 (see FIG. 8), and could differentiate insurance providers, corporations offering the insurance, etc.

Following Intro 1020, Life Module Template 1010 causes a menu to be displayed on the screen, offering prospective customers a choice of educational options to explore. These options are illustrated and discussed below (starting with FIG. 14) with reference to a Life Module example scenario. The first Element represents the first menu choice, "What Is It?" 1030. Once again, Life Module Template 1010 includes a choice of multiple different Elements from which a user/provider of Config Tool 175 can select. In this example, two alternatives are illustrated: a short single-Step Element 1032, or a longer 4-step Element 1034. Each Step may of course contain multiple component Dialogues (text, audio, visuals, animations, etc.), Questions, Responses, etc.

Another Element in Life Module Template 1010 is Calculator 1035, which in this example offers a choice among a simple 1036, complex 1037 and multi-step 1038 calculator. These calculators (e.g., widgets that implement particular formulas to calculate numeric amounts, percentages, etc. on given data constants and variables) can be associated with certain aspects of Plan Design 1015. For example, Calculator 1035 might be employed to calculate a life insurance benefit based upon variables such as a customer's age, salary or deductible, among other factors. Certain calculations require relative simple formulas, in which case simple Calculator 1036 might suffice, while other calculations require more complex 1037 and even multi-step 1038 Calculators. In other embodiments, Life Module Template 1010 could include multiple different calculators, each selecting from simple, complex, multi-step or other types of Calculators.

Just as Life Module Template 1010 includes an Intro Element 1030, it also includes a Closing Steps Element 1040, which might for example, provide some final summary information (not shown) to facilitate the prospective customer's purchase decision. Note that some or all of the Elements included in Life Module Template 1010 can be configured and customized in Config Tool 175.

In addition, to further simplify the configuration process, the concept of Presets 1050 enables third-party providers and developers to save lists of multiple different configurations. For example, Preset A 1052 (which could be given a more descriptive name) includes 5 different configuration selections: (i) a particular Plan Template (#2), (ii) a particular "What Is It?" Element (long 4-step Element 1034), (iii) simple Calculator 1036, (iv) long Intro Audio 1025, and (v) Company A Logo 1027. This enables a user/provider of Config Tool 175 to select all 5 of these configuration choices with a single selection of Preset A 1052. Similarly, Preset B 1054 includes 4 selections (some of which overlap with Preset A 1052): (i) Plan Template (#2), (ii) short 1-step "What Is It?" Element 1032, (iii) simple Calculator 1036, and (iv) short Intro Audio 1024. Other Presets (e.g., Preset n 1056) may also be selected via Config Tool 175.

Finally, a Character Library 1060 (including a database of character parts) enables third-party providers and developers to configure and customize various different aspects of a virtual character's appearance and behavior. In one embodiment, the ability to customize virtual character attributes is included in Config Tool 175. In others, a separate tool is provided. In the example illustrated in FIG. 10, a user/provider can select from among 2 different character sets (Character Set A 1070 or Character Set 1075), each of which includes different component parts. Character Set A 1070, for example, includes parts 1073 (implemented in this embodiment as Adobe Flash "SWF" animation files) which can be combined selectively to generate a particular animation 1071 of that character. Other component parts 1074 can be combined selectively to generate a different animation 1072 of that same virtual character. Similarly, Character Set B 1075 includes component parts 1078 which can be combined selectively to generate animation 1076, while component parts 1079 can be combined selectively to generate animation 1077. A more detailed discussion of Character Library 1060, and the manner in which these component parts can be selected to generate different animations of the same basic characters by modifying their appearance and behavior, is set forth below with respect to FIG. 13.

Figure 11:
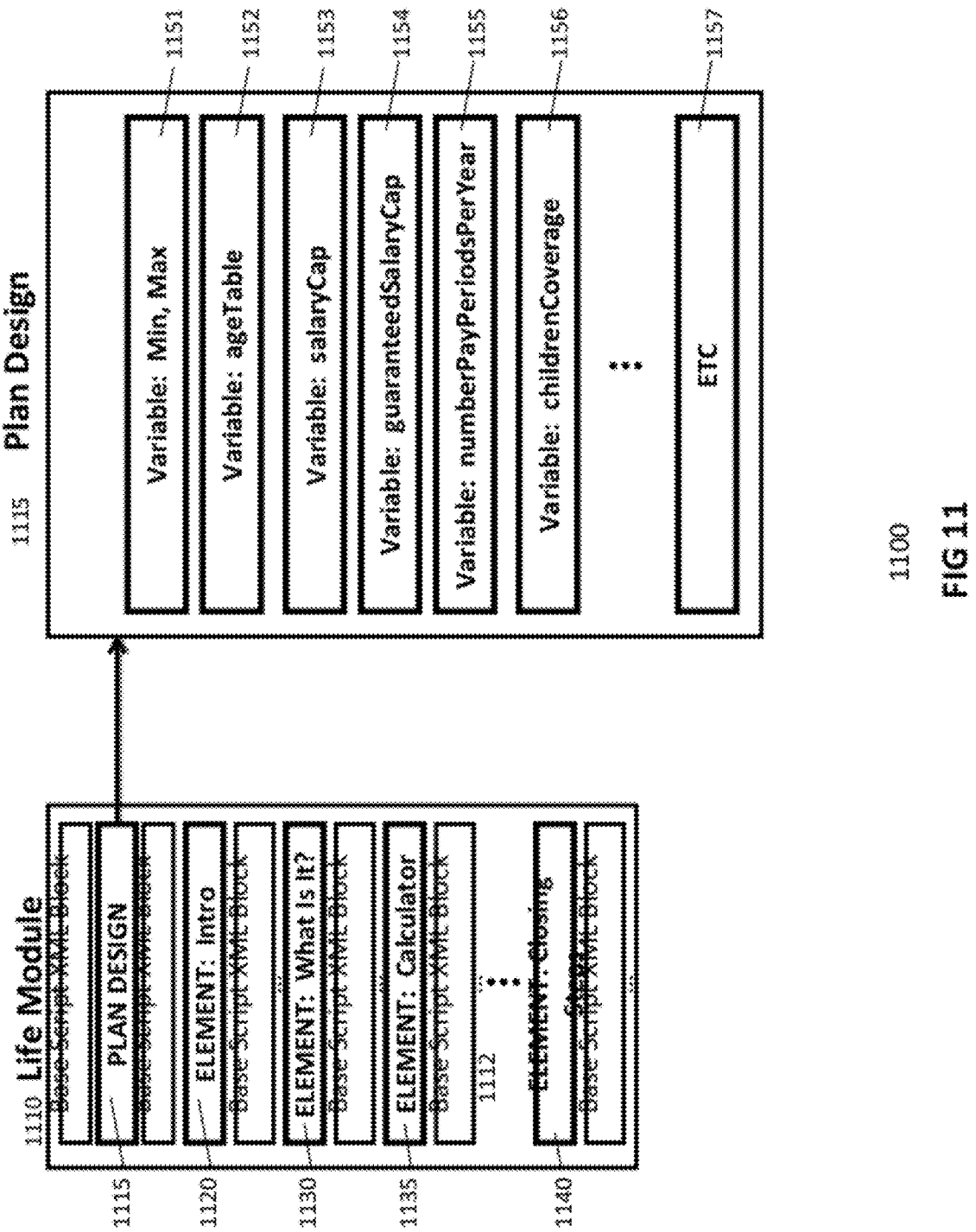
FIG. 11 is a block diagram of one embodiment of a Life Module Template, which invokes a Plan Template, including component variables and other data structures that can be modified via the Config Tool.

Turning to the Templates 1100 illustrated in FIG. 11, Life Module Template 1110 is shown to include the same basic Elements discussed above with respect to FIG. 10, including Plan Design Template 1115, Intro Element 1120, the "What Is It?" Element 1130 (corresponding to a particular menu item), Calculator Element 1136 and "Closing Steps" Element 1140, with each Element being driven by a Base Script XML Block 1112.

Plan Design Template 1115 in turn includes variables representing common data components that are utilized to generate various aspects of a particular life insurance plan, such as Minimum and Maximum coverage amounts 1151, an ageTable data structure 1152 (used, for example, to hold different benefit values associated with different age ranges), a Salary Cap data structure 1153, along with certain Guaranteed Salary Cap amounts 1154, a variable number of Annual Pay Periods 1155, values for covering children 1156, and a host of other data variables that are common to particular types of life insurance plans. Where different providers offer significantly different types of plans having fewer common data variables, multiple different Plan Templates can be employed, again allowing a provider to select among them via Config Tool 175.

Figure 12:
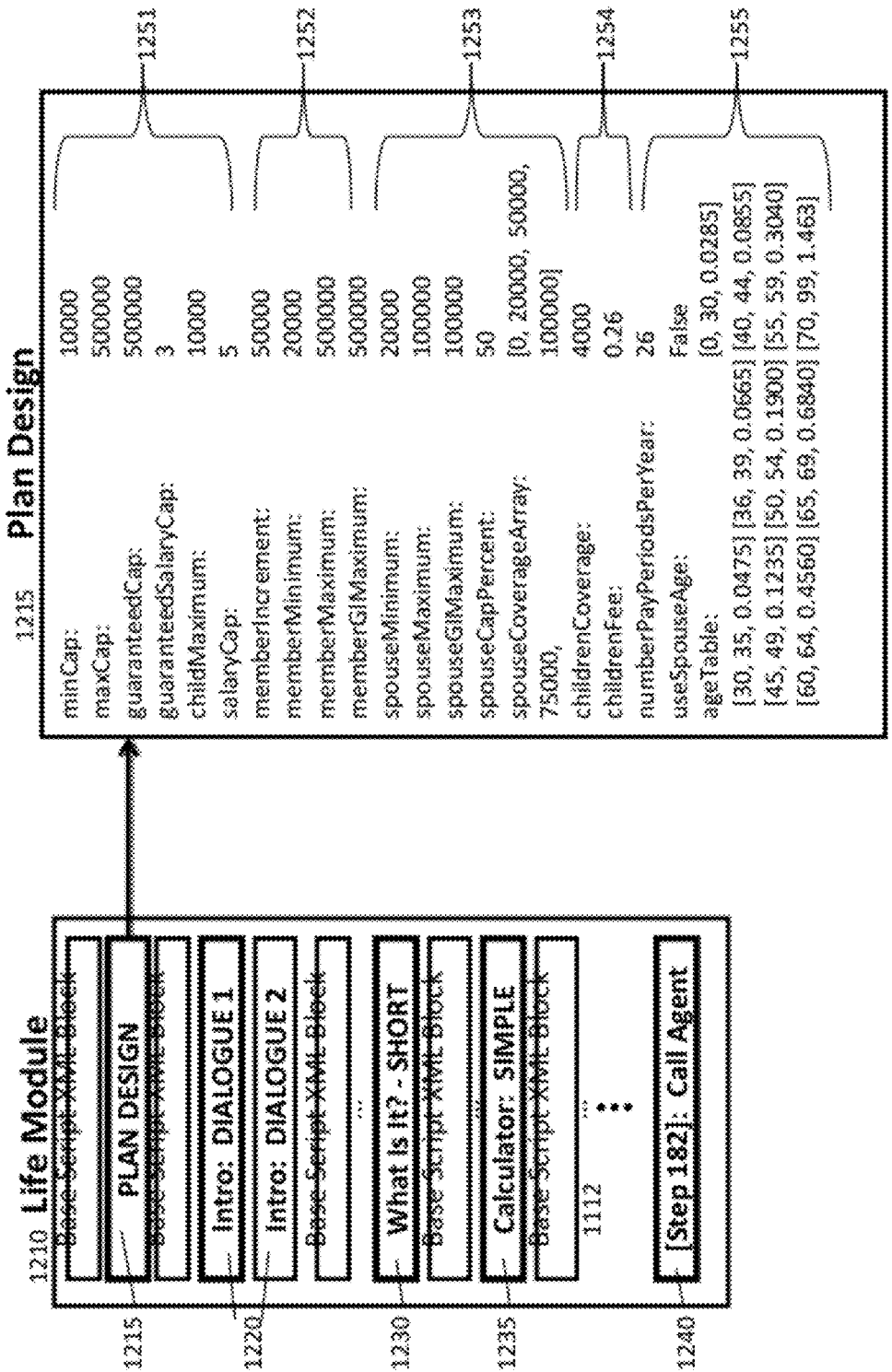
FIG. 12 is a block diagram illustrating sample values for the Life Module Template and Plan Template of FIG. 11.

The Templates 1200 shown in FIG. 12 illustrate the corresponding Templates 1100 from FIG. 11 (now Life Module Template 1210 and Plan Design Template 1215), with selected data values filled into the corresponding template data structures. For example, Intro Element 1120 from FIG. 11 is now represented as Intro Element 1220 of FIG. 12, which includes the selection of specific Dialogue 1 and Dialogue 2 Elements. "What Is It?" Element 1130 from FIG. 11 is now represented as the "short" version of "What Is It?" Element 1220 of FIG. 12 (e.g., a version with fewer Dialogues than other alternative versions). Calculator Element 1135 of FIG. 11 now reflects the choice of a simple Calculator 1235 in FIG. 12. Finally, "Closing Steps" Element 1140 of FIG. 11 now reflects the selection of a particular "Call Agent" Step 1240 as the final Element of Life Module Template 1210 that will be displayed to prospective customers.

Moreover, with respect to Plan Design Template 1215, the values of the various different types of data have been filled into the corresponding data structures. For example, data values 1251 include selected amounts for global, "plan-level" minimum, maximum and guaranteed caps (including maximums for children), while data values 1252 include similar amounts for individual plan members. Data values 1253 include similar amounts for spouses (including percentage caps and different array levels for spousal coverage), while data values 1254 include coverage amounts and fee multipliers for children. Finally, data values 1255 include miscellaneous global, "plan-level" values, such as the number of annual pay periods, a decision not to take the spouse's age into account and an age table including coverage multipliers for different age ranges.

IV. Configurable Character Libraries

Figure 13:
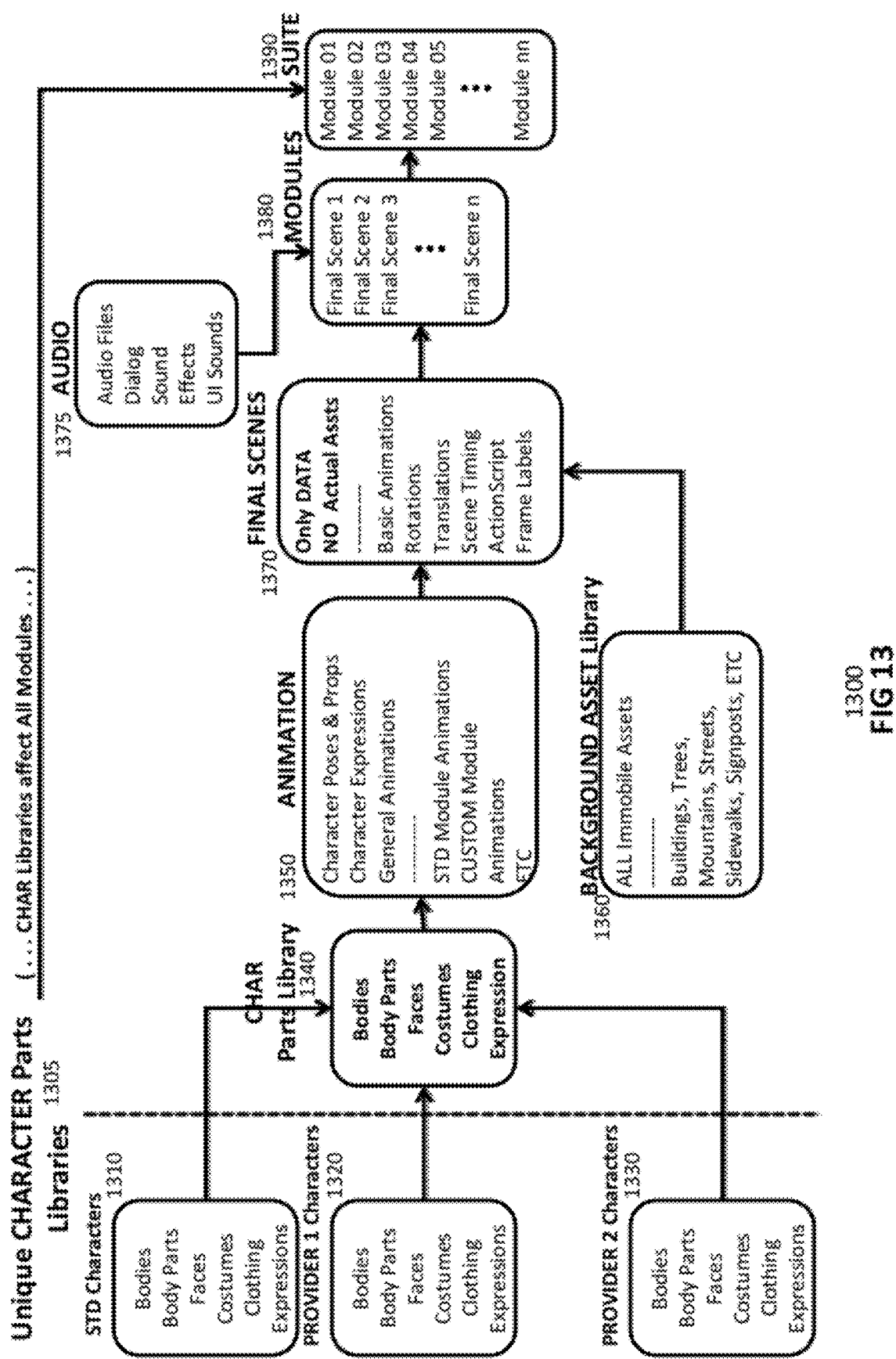
FIG. 13 is a block diagram of one embodiment of Character Libraries of the present invention, illustrating various components that can be selected to configure the appearance and behavior of Virtual Characters appearing in one or more Product Modules.

As referenced above, Character Library 1300 shown in FIG. 13 can be modified via Config Tool 175 or, in another embodiment, via a separate tool dedicated to the selection of individual character parts. For example, a third-party provider or developer might select from among multiple different Virtual Character Sets (i.e., libraries of character parts) 1305, including a default set of standard characters 1310 and other customized character sets, such as Provider 1 characters 1320 and Provider 2 characters 1330.

In one embodiment, each of the Character Sets 1305 contains certain core components, including (i) Bodies, (ii) Body Parts, (iii) Faces; (iv) Costumes; (v) Clothing and (vi) Expressions. These core components are designed to be combined to enable the creation of individual virtual characters whose identity is retained even when animated exhibiting different appearances and behaviors.

For example, by selecting a particular Body, Body Parts (e.g., hands, legs, etc) and Face, a distinct recognizable virtual character can be created. That virtual character can then be employed to generate multiple different animation sequences, exhibiting different behaviors (talking, walking, running, etc.). Moreover, the appearance of that virtual character can be modified by altering its Costumes, Clothing and facial Expressions.

Upon selecting a virtual Character Set 1340, and customizing its appearance, a provider can then select from among various different behaviors in Animation Library 1350. For example, the selected virtual character can be deployed in different poses surrounded by different props, and exhibiting various different facial expressions. Standard and custom animations can be chosen to enable selected virtual characters to exhibit a wide variety of different behaviors.

In addition, background settings for selected virtual characters can be selected from Background Asset Library 1360, including visual assets such as buildings, trees, mountains, streets, sidewalks and signposts, as well as background animations. Selections from Animation Library 1350 and Background Asset Library 1360 are integrated into vignettes forming Final Scenes 1370 that will be displayed to prospective customers.

In one embodiment, Final Scenes 1370 include only programmatic data, distinct from the actual assets themselves. Such data include script logic (implemented, for example, in ActionScript) and Frame Labels, and controls scene timing as well as the playback of selected animations (including rotations and other translations). A distinct Audio Library 1375 is integrated with multiple Final Scenes 1370 to form Product Modules 1380 that ultimately will be deployed to prospective customers. A Suite 1390 of these Product Modules 1380 is then available for subsequent configuration and customization (before and during runtime) by third-party providers and developers.

Once Product Modules 1380 are completed, they can be deployed on various different platforms, including web-based or corporate server platforms (such as Server Platform 130 in FIG. 1*a*), as well as mobile phones and social networks such as Facebook and other Network Platforms 140 that can support client or server-based applications.

To illustrate the result of deploying these customized Program Modules 1380, an example scenario of a deployed Life Module is depicted in FIGS. 14-27 and discussed in greater detail below.

V. Configurable Life Module Scenario

FIG. 14 illustrates an initial screen 1400 displayed after a prospective customer logs into the system, is authenticated and invokes the Life Module. Note that this Life Module could also be invoked from another network platform (e.g., a game deployed on a social network or mobile phone which links to a server-based platform on which the Life Module is hosted).

Screen 1400 includes a depiction of a virtual character, in this case trusted insurance advisor Harvey Keck 1410, who can interact with and educate the prospective customer regarding a provider's insurance products, and ultimately enable the purchase of such products. Note that Harvey 1410 is the result of a particular selected combination of virtual character parts (face, body, arms, legs, etc), and exhibits a desired appearance (e.g., clothes, glasses, etc) as well as various animated behaviors (movements, gestures, etc), along with background visual elements, such as his desk 1415.

In addition, navigation buttons are displayed to enable the prospective customer to interact with Harvey 1410, and invoke certain functionality. For example, button 1420 will toggle (e.g., mute) the audio, including Harvey's voice and any background sounds. Button 1430 will display a scene Menu that is discussed with respect to FIG. 16 below. Button 1440 navigates backward in the Life Module (e.g., Step by Step back through distinct scenes or groups of Elements within Life Module), while button 1450 Skips forward through such Steps. At any given moment, rather than proceeding linearly through the Life Module, the prospective customer can select button 1460 to invoke a Plan Summary scene or button 1470 to Enroll in and purchase one or more of the offered insurance plans.

Figure 15A:
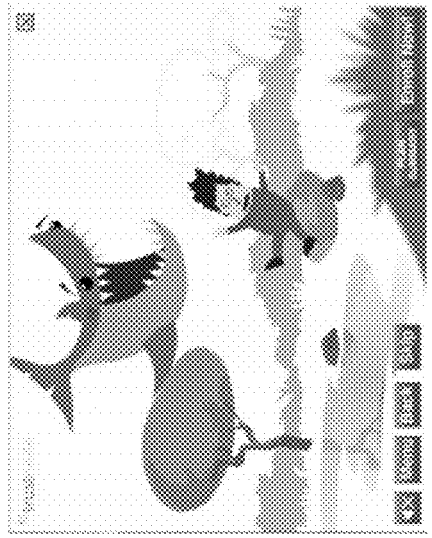
FIGS. 15a-15c are screen snapshots illustrating an opening animation introducing the concept of life insurance in one embodiment of a Life Module of the present invention.
Figure 15B:
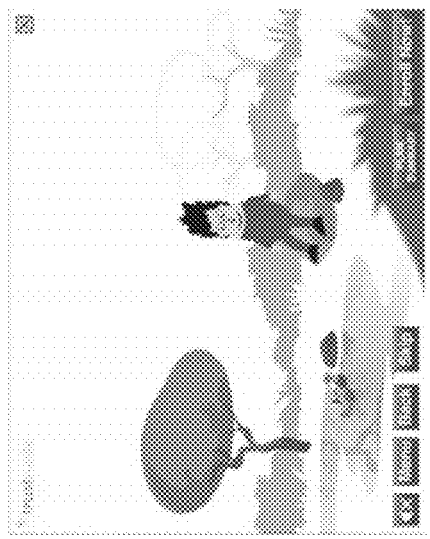
Figure 15C:
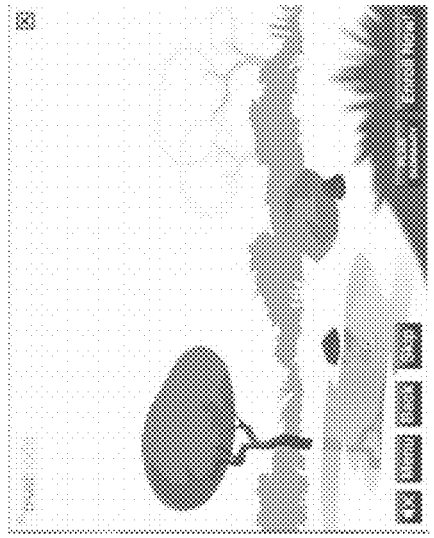

Upon the launch of the Life Module, the Intro Element will be invoked (discussed with respect to FIGS. 10-12 above), and Harvey 1410 will begin speaking the selected Dialogue(s), accompanied by any associated Text, Audio, Animations, etc. FIGS. 15*a*-15*c* illustrate an opening animation scene in which Harvey 1410 educates the prospective customer regarding the concept of life insurance and the need to protect against unexpected risks.

Following this introductory scene, a menu screen 1600 (depicted in FIG. 16) is displayed, and Harvey 1610 presents the prospective customer with various choices with respect to life insurance, such as menu item 1620 ("What Is It"), menu item 1630 ("Why Should I Buy It), menu item 1640 ("How Does It Work?") and menu Item 1650 ("How Much Should I Buy?"). Each of these choices will be discussed below. Note that these choices are the result of configuration selections in the Plan Template itself (e.g., via the Config Tool), including the Dialogue that Harvey 1610 speaks while menu screen 1600 is displayed.

Figure 17:
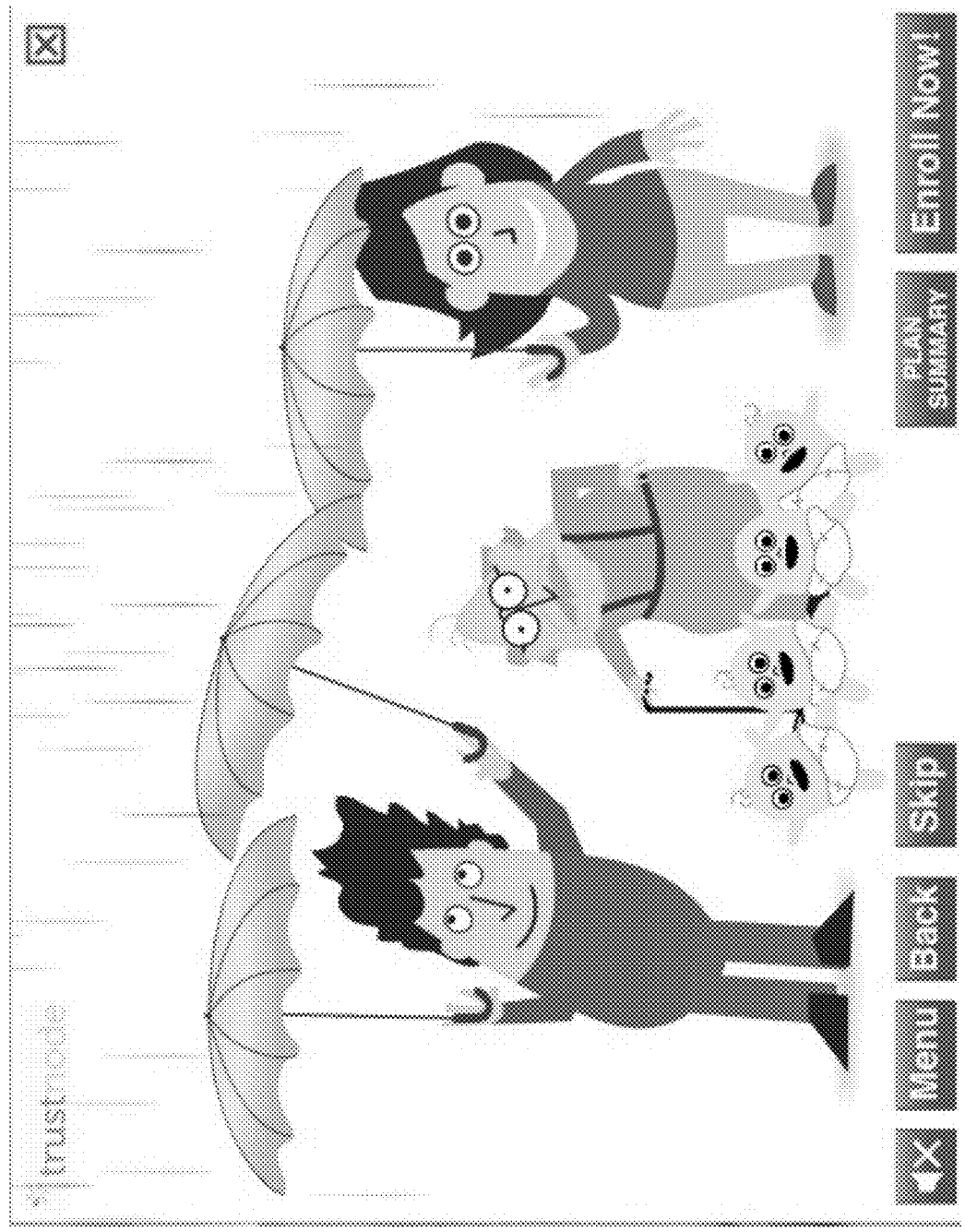
FIG. 17 is a screen snapshot illustrating the results of the configuration (via the Config Tool) of a "short" version of an Element (the "What Is It?" Element of one embodiment of a Life Module Template of the present invention) when a user selects a menu item corresponding to that Element.
Figure 18:
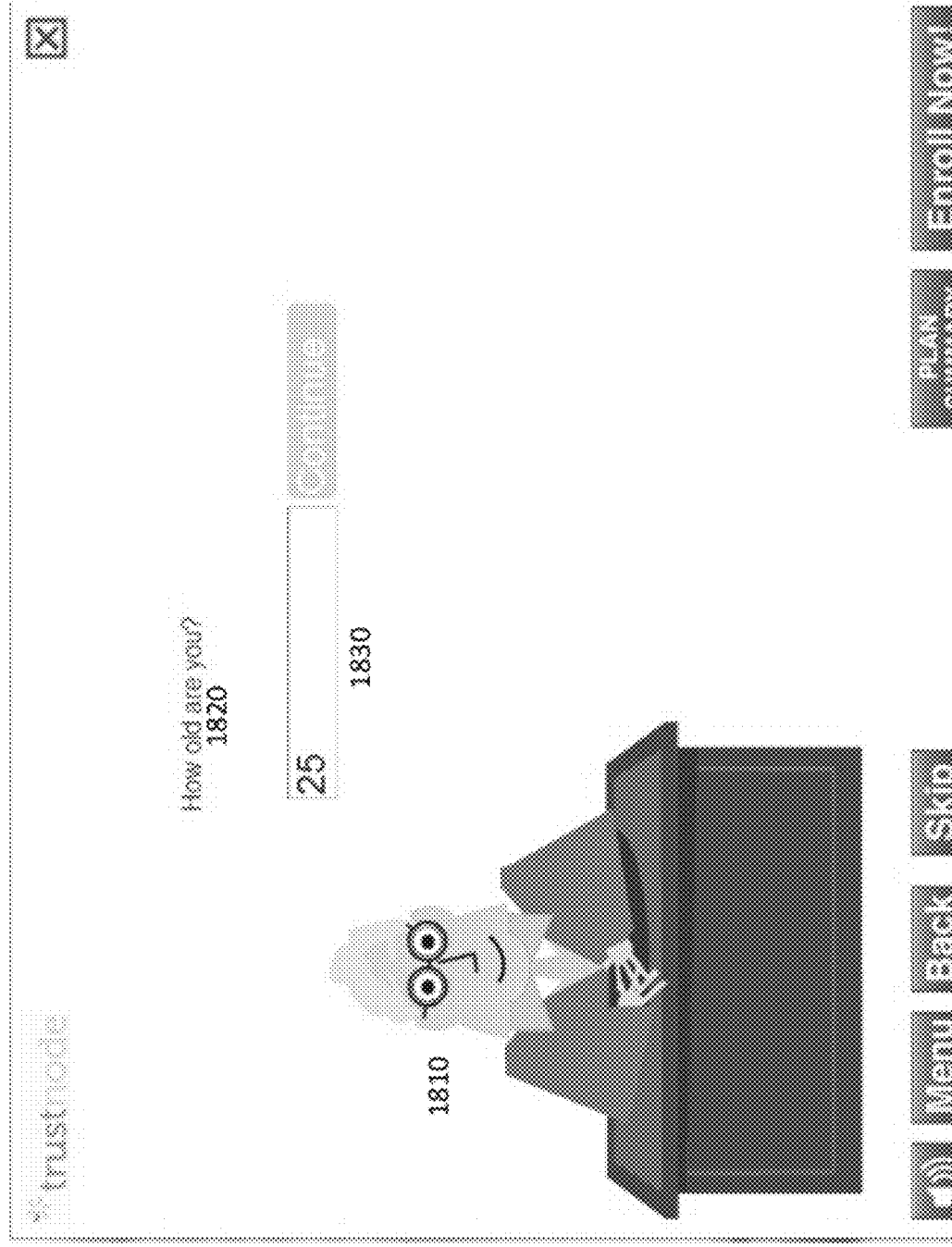
FIGS. 18 and 19*a-f* are screen snapshots illustrating the results of configuration (via the Config Tool) of an Element (the "Why Should I Buy It?" Element of one embodiment of a Life Module Template of the present invention) when a user selects a menu item corresponding to that Element and enters an age (25) indicating that they fall within the "Gen Y" demographic group.

Should a prospective customer select menu item 1620, then a "What Is It?" Element would be invoked, illustrated in screen 1700 of FIG. 17. In this example, a simple and short animation is played (a snapshot of which is illustrated in FIG. 17), accompanied by Harvey's background audio summarizing the concept of life insurance (e.g., protecting yourself and your family against the prospect of a "rainy day" or unexpected risk). This example could result from the provider's selection of a "short" Element, such as Element 1032 depicted in FIG. 10.

FIGS. 18-22 illustrate the results of a prospective customer selecting the "Why Should I Buy It?" menu item 1630 shown in FIG. 16. Screen 1800 begins with Harvey 1810 asking the prospective customer to enter his or her age, accompanied by the textual Question 1820 ("How Old Are You?") and text input box 1830.

In this example, the prospective customer enters "25" in text input box 1830, which invokes screens 1910-1950 in FIGS. 19*a*-19*f*. As a result of the provider's selection of various choices for this option, Harvey voices a Dialogue indicating that the prospective customer falls within the "Gen Y" demographic group. The associated animations depicted in FIGS. 19*a*-19*f* involve other virtual characters in a series of vignettes accompanied by Harvey's educational Dialogues. Note that these vignettes are the results of a provider's configuration via the Config Tool.

Figure 19A:
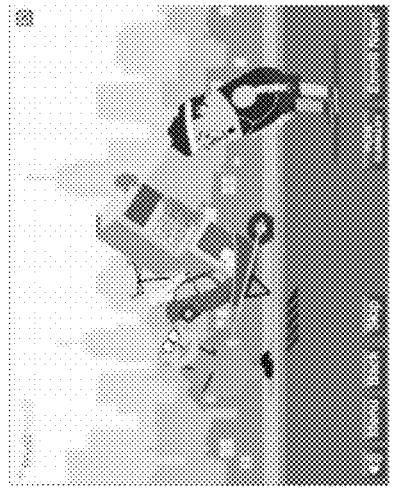
Figure 19B:
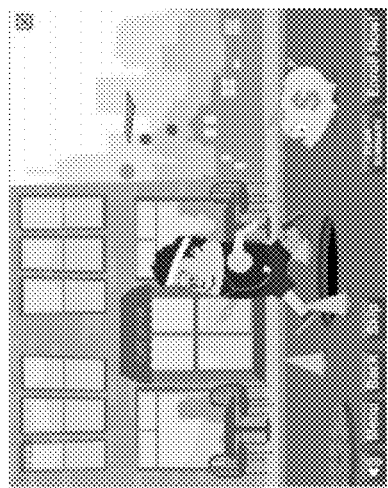
Figure 19C:
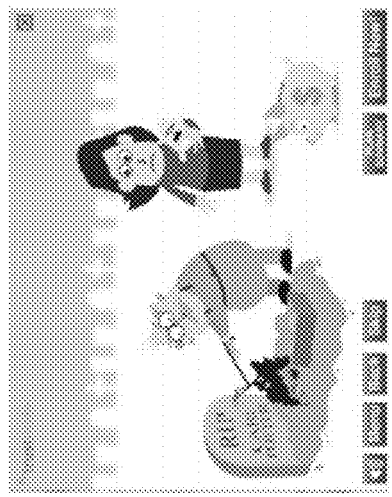
Figure 19D:
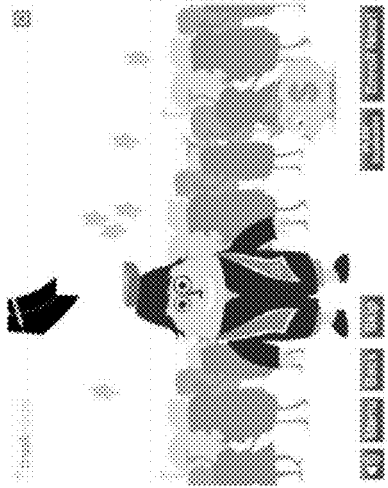
Figure 19E:
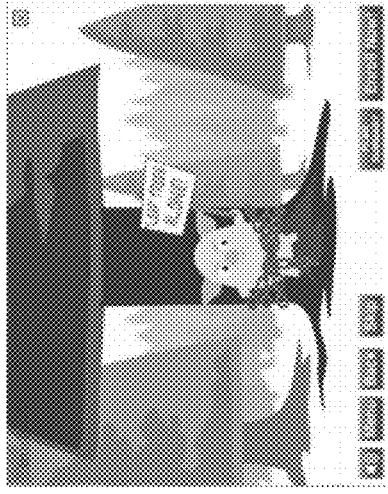
Figure 19F:
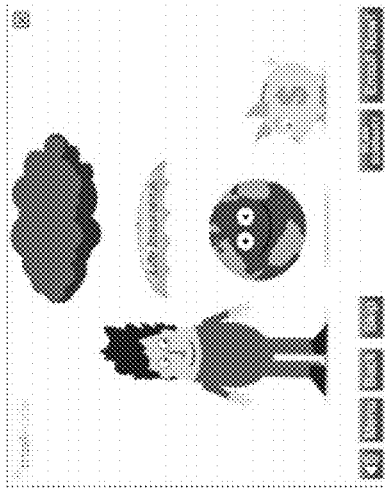

For example, Harvey begins by explaining that younger people don't necessarily have the same financial responsibilities as do older people (FIG. 19*a*), but that benefits can be enjoyed at low group rates (FIG. 19*b*). Such benefits can include payment of funeral expenses for loved ones (FIG. 19*c*), college tuition for a kid brother (FIG. 19*d*), contributions to charitable causes such as preventing deforestation (FIG. 19*e*), or just putting aside money for a rainy day (FIG. 19*f*).

Figure 20:
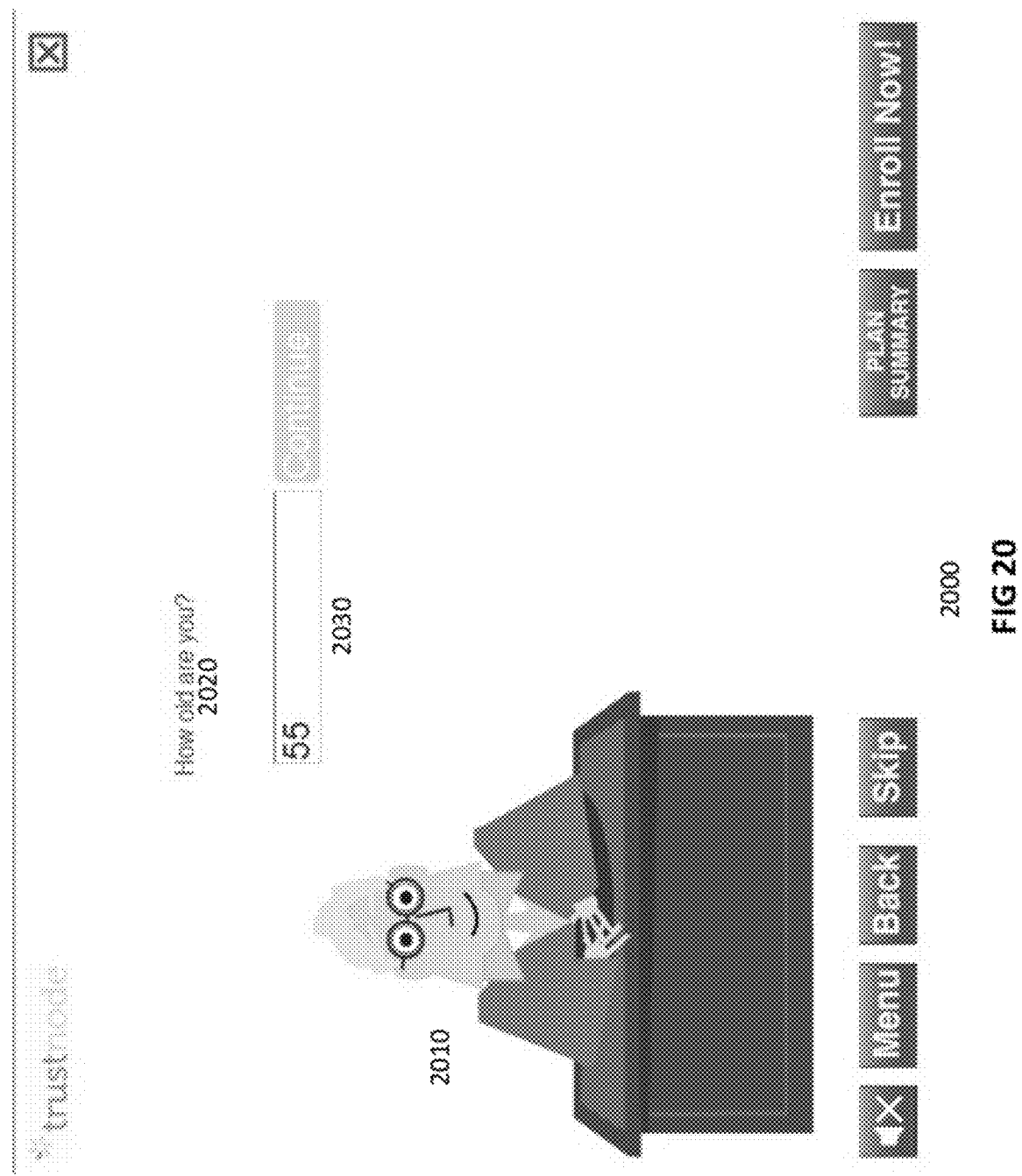
Figure 22B:
Figure 22A:
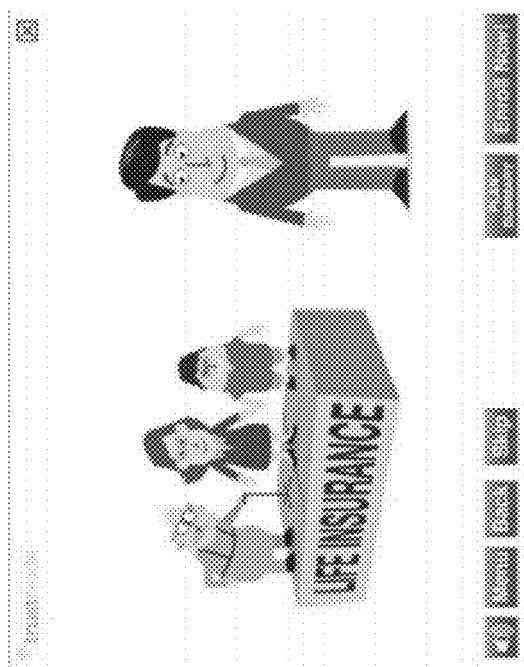
Figure 23A:
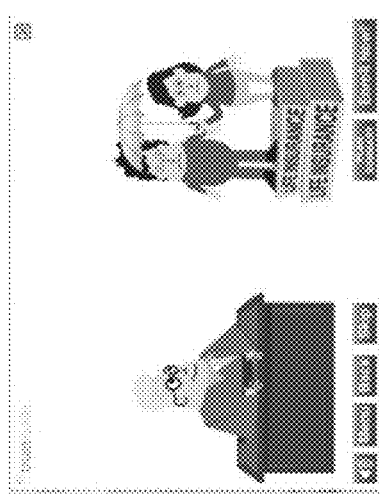
FIGS. 23*a-f* are screen snapshots illustrating the results of configuration (via the Config Tool) of an Element (the "How Does It Work?" Element of one embodiment of a Life Module Template of the present invention) when a user selects a menu item corresponding to that Element.
Figure 23B:
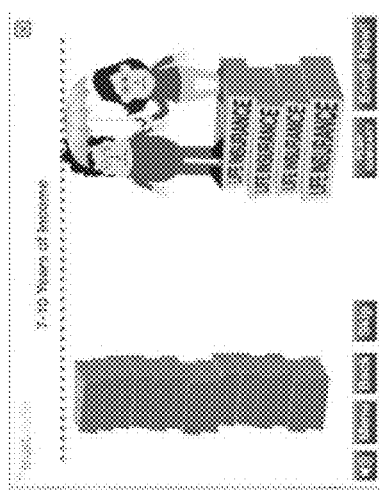
Figure 23C:
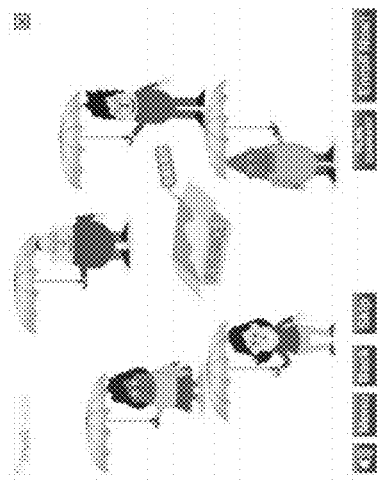
Figure 23D:
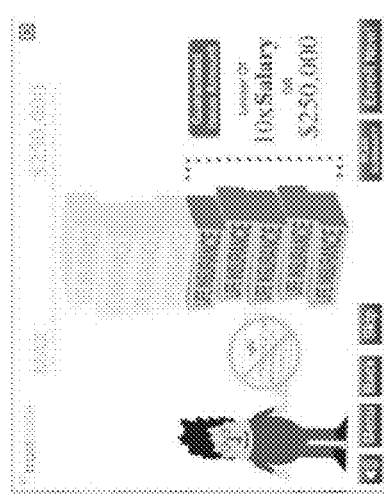
Figure 23E:
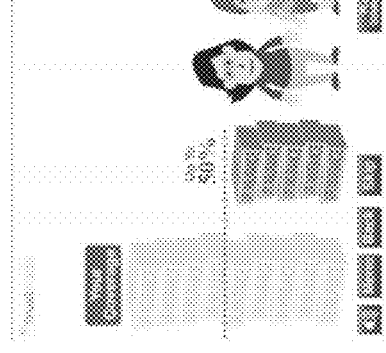
Figure 23F:
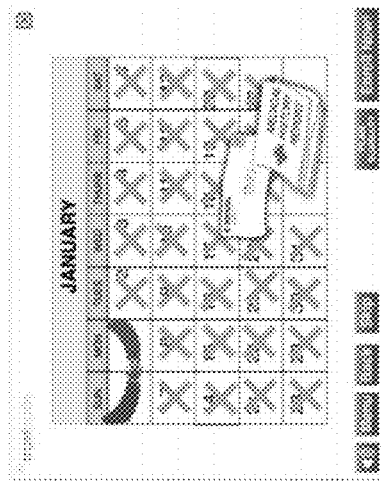

Alternatively, if the prospective customer entered the age of "55," as shown in input text box 2030 of FIG. 20, a slightly more complex set of Elements is invoked, as illustrated in screen 2100 of FIG. 21. A set of 3 menu choices is presented to the prospective customer, accompanied by Harvey's Dialogue indicating that the prospective customer is a "baby boomer" like Harvey. In this example (again as a result of third-party selections made via the Config Tool), if the prospective customer selects menu item 2130 ("Inheritance For Your Heirs"), then screen 2210 of FIG. 22*a* is displayed, accompanied by Harvey's explanation that life insurance benefits can be paid to heirs such as aging parents, children and others. If menu item 2140 ("Pay For Your Final Expenses") is selected, then screen 2220 of FIG. 22*b* is displayed, accompanied by Harvey's explanation that life insurance benefits can cover funeral costs, estate administration costs, debts, etc. Finally, menu item 2150 returns the prospective customer to the Main Menu on screen 1600 of FIG. 16.

FIGS. 23*a-f* illustrate the results of a prospective customer selecting the "How Does It Work?" menu item 1640 shown in FIG. 16. Harvey educates prospective customers regarding life insurance through a series of Dialogues, including associated animations. For example, Harvey explains that Americans are typically underinsured (screen snapshot 2310 of FIG. 23*a*) and would need to double their life insurance coverage to replace 7-10 years of income (screen snapshot 2320 of FIG. 23*b*). Harvey notes that relatively low group rates (screen snapshot 2330 of FIG. 23*c*) are available to groups, such as employees of a company, due to price breaks offered to groups by insurance carriers. Harvey goes on to explain (screen snapshot 2340 of FIG. 23*d*) the concept of a "guaranteed issue amount"—i.e., the portion of the maximum coverage authorized by the insurance provider (in this case, $250,000) that is available for purchase (e.g., the lesser of the $250,000 maximum and 10% of a prospective customer's annual salary). Harvey notes that coverage can also be purchased for the insured's spouse and children (screen snapshot 2350 of FIG. 23*e*), and that one need not answer medical questions or obtain a physical exam if they enroll during their employer's "enrollment period" or within 31 days of employment (screen snapshot 2360 of FIG. 23*f*).

Figures 25A, 25B:
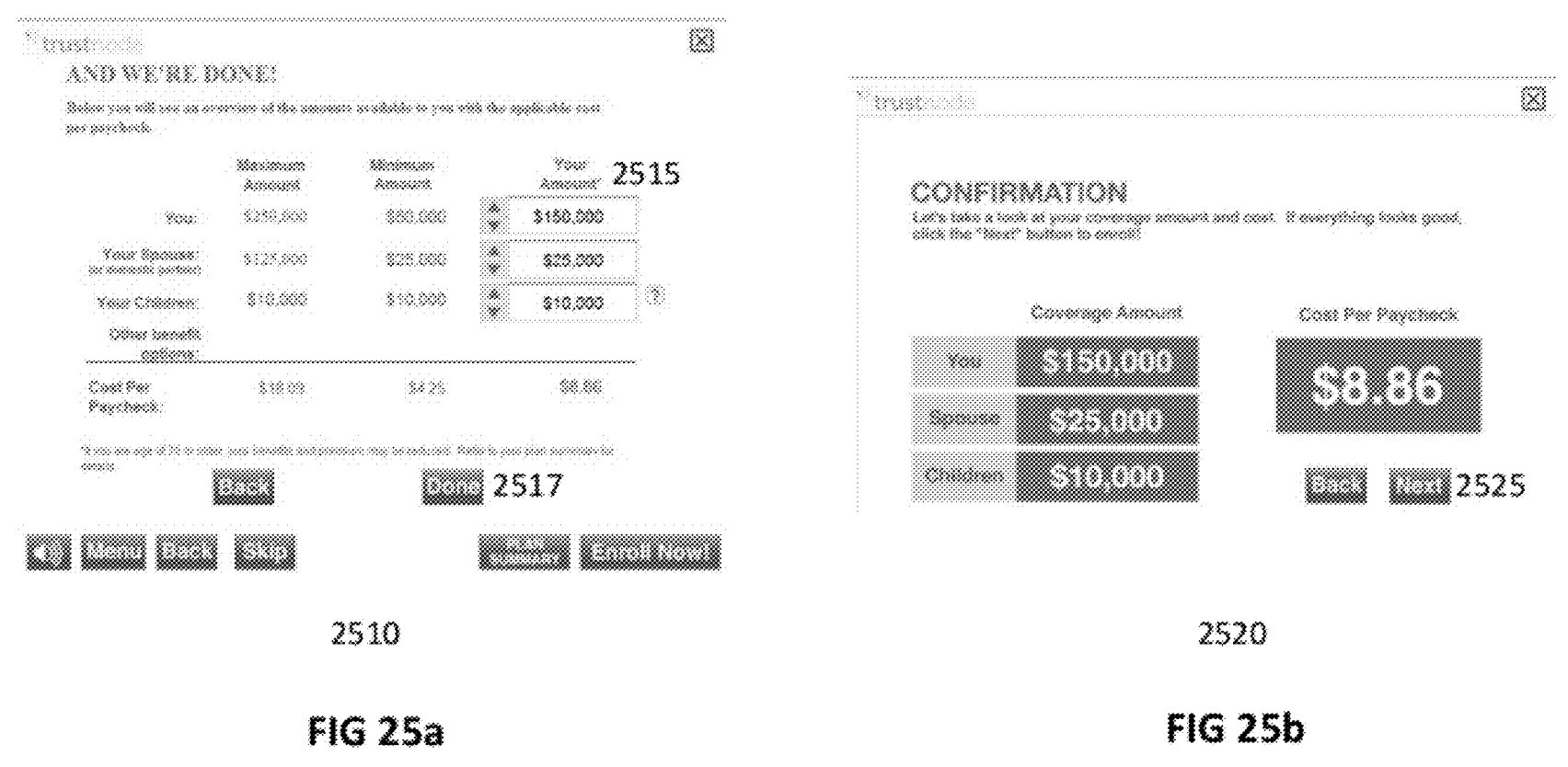

Finally, if a prospective customer selects the "How Much Should I Buy?" menu item 1650, then Harvey asks for information in order to provide an estimate of the appropriate amount of coverage. For example, in screen 2400 of FIG. 24, a prospective customer has indicated that he or she is 25 years old (input text box 2420), has an annual income of $75,000 (input text box 2430) and desires coverage for his or her spouse and children (checkboxes 2440). As a result, information is displayed on screen 2510 of FIG. 25*a* showing costs per paycheck for each family member for a given amount between the plan's minimum and maximum coverage, and allowing the prospective customer to adjust that amount (control 2515) and see the resulting effect on the cost per paycheck. Once the prospective customer is satisfied with the desired coverage amount (i.e., by selecting the "Done" button 2517), then confirmation screen 2520 of FIG. 25*b* is displayed, providing a summary of the coverage and cost data, and allowing the prospective customer to enroll in the plan by selecting "Next" button 2525.

Figure 27B:
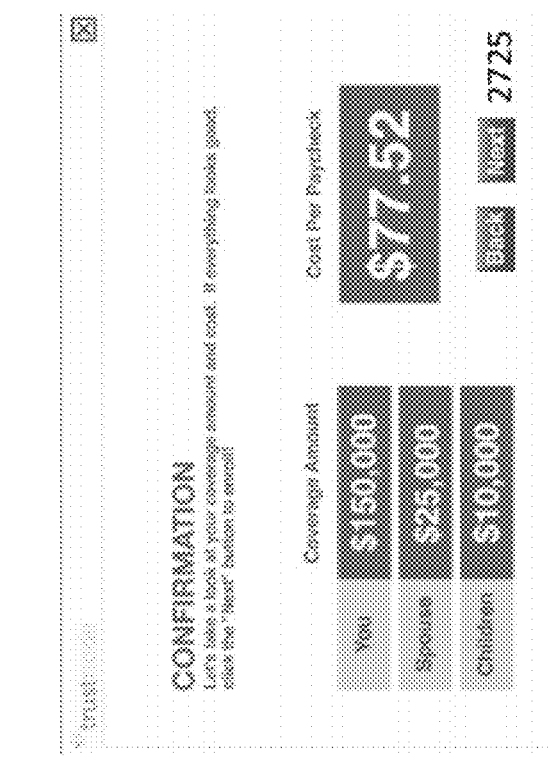
Figure 27A:

Similarly, if the customer indicated (on screen 2600 of FIG. 26) that he or she is 55 years old (input text box 2620), has an annual income of $100,000 (input text box 2630) and desires coverage for his or her spouse and children (checkboxes 2640), then information is displayed on screen 2710 of FIG. 27*a* showing costs per paycheck for each family member for a given amount between the plan's minimum and maximum coverage, and allowing the prospective customer to adjust that amount (control 2715) and see the resulting effect on the cost per paycheck. Once the prospective customer is satisfied with the desired coverage amount (i.e., by selecting the "Done" button 2717), then confirmation screen 2720 of FIG. 27*b* is displayed, providing a summary of the coverage and cost data, and allowing the prospective customer to enroll in the plan by selecting "Next" button 2725.

While particular embodiments of the present invention have been illustrated and described above, it will be apparent to those skilled in the art that various modifications may be made in the arrangement, operation and details of the methods and apparatus disclosed herein without departing from the spirit and scope of the present invention defined in the claims below.

The invention claimed is:

1. A method for enabling online providers of products and services to customize complex multi-stage transactions with prospective customers, the method including the following steps:
    (a) hosting on a first set of computers a deployed application that is accessible from a second set of computers by prospective customers of a plurality of online providers offering to sell particular products or services;
    (b) enabling the online providers to configure, via a third set of computers, one or more runtime assets utilized by the deployed application to personalize interactions with prospective customers; and
    (c) employing a virtual character in the deployed application on the first set of computers to interact with and educate the prospective customers regarding the characteristics and suitability to the prospective customers of particular products or services offered by the online providers, wherein the interaction is personalized by:
        (i) the virtual character extracting demographic and behavioral data from the prospective customers;
        ii) selecting, based upon the extracted data and configured runtime assets, educational materials as well as particular attributes of the goods and services offered by the online providers; and
        (ii) presenting the selected educational materials to the prospective customers to facilitate their purchasing decision.

2. The method of claim 1, wherein the information presented to the prospective customers facilitates their decision as to whether and when to purchase particular products and services offered by the online providers.

3. The method of claim 1, wherein the virtual character recommends to a prospective customer a particular product offered by one of the online providers based upon the selected attributes configured by that online provider and the data extracted from that prospective customer.

4. The method of claim 1, wherein the information presented to a prospective customer is based upon external third-party data, as well as the data extracted from that prospective customer.

5. The method of claim 1, wherein the demographic and behavioral data include one or more of the prospective customer's age, salary, marital status, number of children, job type and job location.

6. The method of claim 1, wherein a prospective customer, after purchasing a particular product or service, receives a recommendation for a related product or service.

7. The method of claim 6, wherein the purchased product or service and the related product or service are offered by different online providers.

8. A system for enabling online providers of products and services to customize complex multi-stage transactions with prospective customers, the system comprising:
    (a) a first set of computers hosting a deployed application that is accessible from a second set of computers by prospective customers of a plurality of online providers offering to sell particular products or services;
    (b) a configuration tool enabling online providers to configure, via a third set of computers, one or more runtime assets utilized by the deployed application to personalize interactions with prospective customers; and
    (c) a virtual character in the deployed application that interacts with and educates the prospective customers regarding the characteristics and suitability to the prospective customers of particular products or services offered by the online providers, wherein the interaction is personalized by:

(i) the virtual character extracting demographic and behavioral data from the prospective customers;

(ii) selecting, based upon the extracted data and configured runtime assets, educational materials as well as particular attributes of the goods and services offered by the online providers; and (ii) presenting the selected educational materials to the prospective customers to facilitate their purchasing decision.

9. The system of claim 8, wherein the information presented to the prospective customers facilitates their decision as to whether and when to purchase particular products and services offered by the online providers.

10. The system of claim 8, wherein the virtual character recommends to a prospective customer a particular product offered by one of the online providers based upon the selected attributes configured by that online provider and the data extracted from that prospective customer.

11. The system of claim 8, wherein the information presented to a prospective customer is based upon external third-party data, as well as the data extracted from that prospective customer.

12. The system of claim 8, wherein the demographic and behavioral data include one or more of the prospective customer's age, salary, marital status, number of children, job type and job location.

13. The system of claim 8, wherein a prospective customer, after purchasing a particular product or service, receives a recommendation for a related product or service.

14. The system of claim 13, wherein the purchased product or service and the related product or service are offered by different online providers.

\* \* \* \* \*